(12) United States Patent
Kiriyama

(10) Patent No.: US 11,469,620 B2
(45) Date of Patent: Oct. 11, 2022

(54) WIRELESS COMMUNICATION APPARATUS AND ELECTRIC POWER DISTRIBUTION CONTROL METHOD

(71) Applicant: SONY CORPORATION, Tokyo (JP)

(72) Inventor: Sawako Kiriyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/976,395

(22) PCT Filed: Jan. 15, 2019

(86) PCT No.: PCT/JP2019/000944
§ 371 (c)(1),
(2) Date: Aug. 27, 2020

(87) PCT Pub. No.: WO2019/171766
PCT Pub. Date: Sep. 12, 2019

(65) Prior Publication Data
US 2021/0057936 A1 Feb. 25, 2021

(30) Foreign Application Priority Data

Mar. 5, 2018 (JP) ............................. JP2018-038937

(51) Int. Cl.
*H02J 50/40* (2016.01)
*H02J 50/80* (2016.01)
(Continued)

(52) U.S. Cl.
CPC ............ *H02J 50/40* (2016.02); *H02J 7/0013* (2013.01); *H02J 50/80* (2016.02); *H04W 88/02* (2013.01)

(58) Field of Classification Search
CPC .......... H02J 50/40; H02J 7/0013; H02J 50/80; H04W 88/02
See application file for complete search history.

(56) References Cited

U.S. PATENT DOCUMENTS 11,121,747 B2 * 9/2021 Tanaka ................ H04W 68/005
2005/0182975 A1 * 8/2005 Guo .................... H04W 52/0216
713/300
(Continued)

FOREIGN PATENT DOCUMENTS

CN 103004053 A 3/2013
EP 2597749 A1 5/2013
(Continued)

OTHER PUBLICATIONS

International Search Report and Written Opinion of PCT Application No. PCT/JP2019/000944, dated Mar. 26, 2019, 10 pagesof ISRWO.

*Primary Examiner* — Daniel Kessie
*Assistant Examiner* — Brian K Baxter
(74) *Attorney, Agent, or Firm* — Chip Law Group

(57) ABSTRACT

Electric power is distributed among wireless communication apparatuses while, at the same time, an electric power level required to operate a wireless communication function in the wireless communication apparatus is maintained. A wireless communication apparatus includes an electric power storage section, a wireless communication section, and a control section. The electric power storage section stores electric power. The wireless communication section engages in wireless communication with other wireless communication apparatuses by using the electric power stored in the electric power storage section. The control section controls passing of electric power stored in the electric power storage section by using the electric power level required to operate a wireless communication section as a threshold. At this time, the control section performs control such that electric power is passed to or from other wireless communication apparatuses according to a priority level assigned to each of the wireless communication apparatuses.

12 Claims, 26 Drawing Sheets

(51) Int. Cl.
*H02J 7/00* (2006.01)
*H04W 88/02* (2009.01)

(56) References Cited

U.S. PATENT DOCUMENTS

| | | | |
|---|---|---|---|
| 2008/0122401 | A1 | 5/2008 | Sato et al. |
| 2013/0134922 | A1 | 5/2013 | Takagi |
| 2014/0091623 | A1* | 4/2014 | Shippy .................. H02J 7/0068 |
| | | | 307/31 |
| 2015/0097433 | A1 | 4/2015 | Shichino |
| 2017/0025857 | A1* | 1/2017 | Matthews ............. H02J 50/001 |
| 2017/0063431 | A1* | 3/2017 | Milne ..................... H02J 7/342 |
| 2018/0254671 | A1* | 9/2018 | Murata ................... H02J 50/20 |
| 2019/0250689 | A1* | 8/2019 | Ivanov ................... H02J 7/025 |
| 2019/0393713 | A1* | 12/2019 | Sherman ................ H02J 50/10 |

FOREIGN PATENT DOCUMENTS

| | | |
|---|---|---|
| JP | 2008-161045 A | 7/2008 |
| JP | 2012-029470 A | 2/2012 |
| JP | 2012-205388 A | 10/2012 |
| JP | 2014-023253 A | 2/2014 |
| JP | 2015-033157 A | 2/2015 |
| JP | 2015-097465 A | 5/2015 |
| JP | 2017-135795 A | 8/2017 |

* cited by examiner

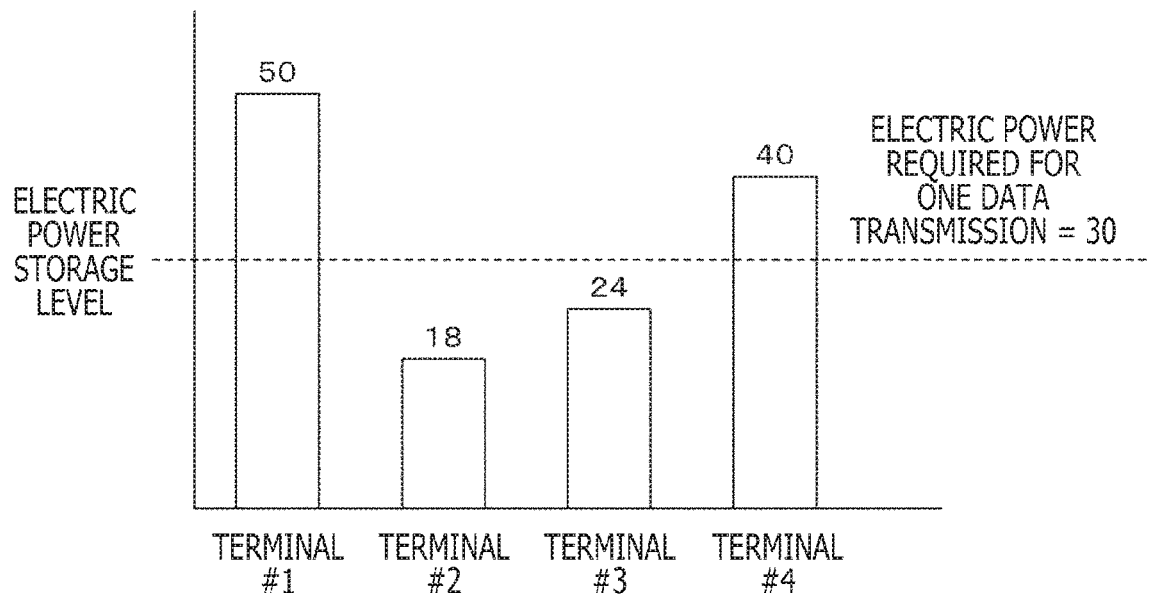
FIG. 10A  BEFORE ELECTRIC POWER DISTRIBUTION
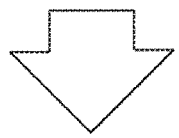
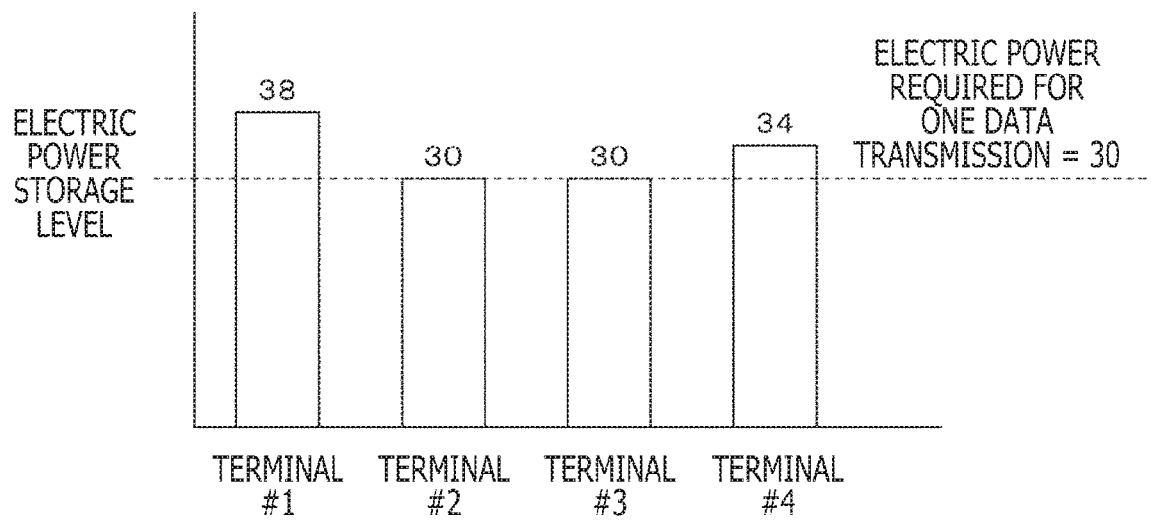
FIG. 10B  AFTER ELECTRIC POWER DISTRIBUTION

| 641 | 645 | 646 | 647 | ... | 646 | 647 |
|---|---|---|---|---|---|---|
| FRAME TYPE | NUMBER OF TERMINALS SUBJECT TO DISTRIBUTION | TERMINAL IDENTIFIER #1 | DISTRIBUTION LEVEL #1 | ... | TERMINAL IDENTIFIER #n | DISTRIBUTION LEVEL #n |

FIG.18

| FRAME TYPE | TERMINAL IDENTIFIER | ELECTRIC POWER STORAGE LEVEL | TIME TO NEXT DATA TRANSMISSION |
|---|---|---|---|
| 641 | 642 | 643 | 648 |

| TERMINAL IDENTIFIER | PRIORITY LEVEL | TIME TO NEXT TRANSMISSION | STORAGE LEVEL |
|---|---|---|---|
| #1 | 2 | 5 MINUTES | 40 |
| #2 | 3 | 10 MINUTES | 15 |
| #3 | 1 | 3 MINUTES | 12 |
| #4 | 4 | 12 MINUTES | 35 |

FIG. 22A  PRIORITY LEVEL DETERMINATION

| TERMINAL IDENTIFIER | DISTRIBUTION LEVEL FOR TERMINAL #3 | STORAGE LEVEL AFTER DISTRIBUTION |
|---|---|---|
| #1 | 0 | 40 |
| #2 | 0 | 15 |
| #3 | — | — |
| #4 | 18 | 17 |

FIG. 22B  DISTRIBUTION TO TERMINAL #3

| TERMINAL IDENTIFIER | DISTRIBUTION LEVEL FOR TERMINAL #1 | STORAGE LEVEL AFTER DISTRIBUTION |
|---|---|---|
| #1 | — | — |
| #2 | 0 | 15 |
| #3 | 0 | 30 |
| #4 | 0 | 17 |

FIG. 22C  DISTRIBUTION TO TERMINAL #1

| TERMINAL IDENTIFIER | DISTRIBUTION LEVEL FOR TERMINAL #2 | STORAGE LEVEL AFTER DISTRIBUTION |
|---|---|---|
| #1 | 10 | 30 |
| #2 | — | — |
| #3 | 0 | 30 |
| #4 | 5 | 12 |

FIG. 22D  DISTRIBUTION TO TERMINAL #2

| FRAME TYPE | TERMINAL IDENTIFIER | ELECTRIC POWER STORAGE LEVEL | POSITION COORDINATES |
|---|---|---|---|
| 641 | 642 | 643 | 649 |

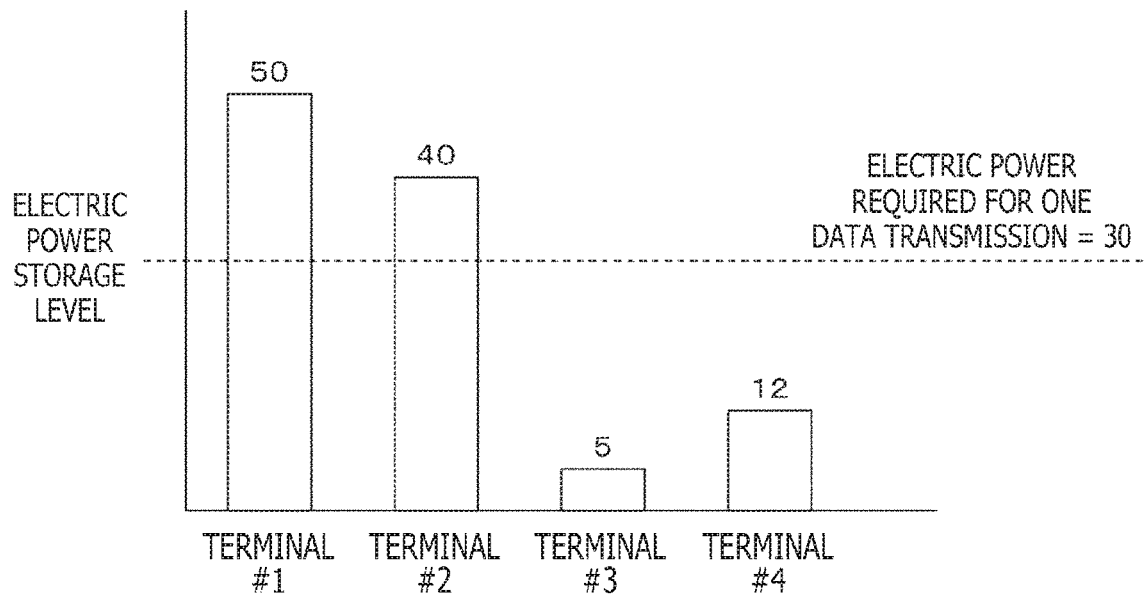
FIG. 26A  BEFORE ELECTRIC POWER DISTRIBUTION
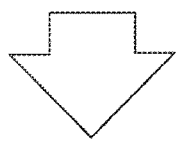
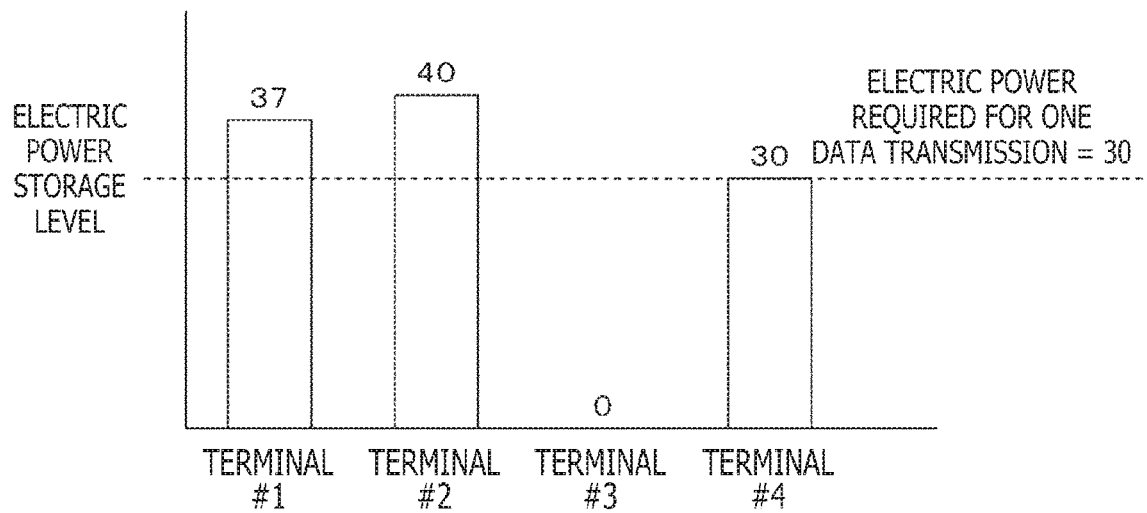
FIG. 26B  AFTER ELECTRIC POWER DISTRIBUTION

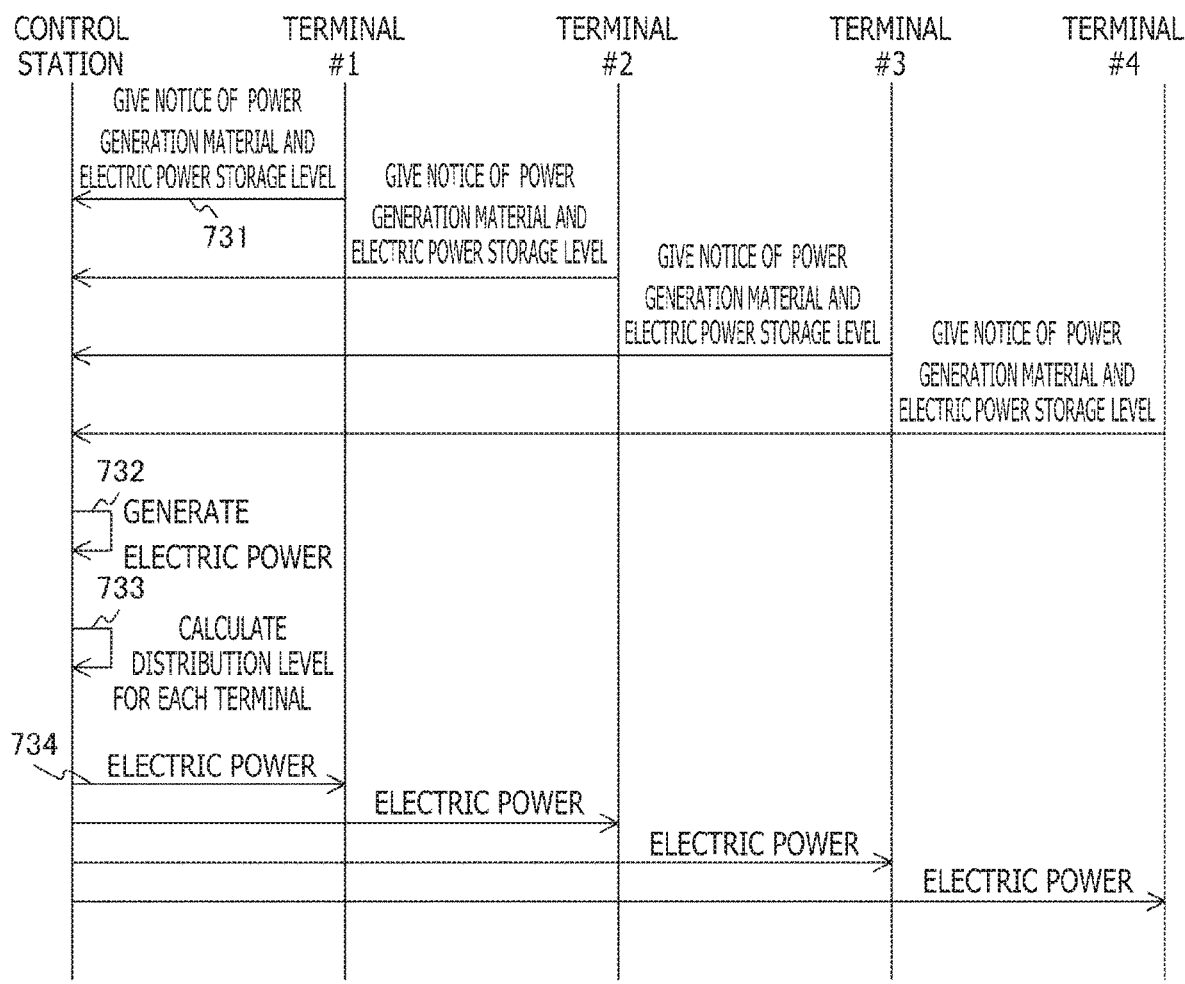

WIRELESS COMMUNICATION APPARATUS AND ELECTRIC POWER DISTRIBUTION CONTROL METHOD

CROSS REFERENCE TO RELATED APPLICATIONS

This application is a U.S. National Phase of International Patent Application No. PCT/JP2019/000944 filed on Jan. 15, 2019, which claims priority benefit of Japanese Patent Application No. JP 2018-038937 filed in the Japan Patent Office on Mar. 5, 2018. Each of the above-referenced applications is hereby incorporated herein by reference in its entirety.

TECHNICAL FIELD

The present disclosure relates to a wireless communication apparatus. More specifically, the present disclosure relates to a wireless communication apparatus for distributing electric power, a processing method thereof, and a program for causing a computer to perform the processing method.

BACKGROUND ART

New services can be created by transmitting sensing information and other types of information acquired by a wireless communication apparatus, through wireless communication. For example, a monitoring service can be realized by attaching a wireless communication apparatus (wireless sensor terminal) with a GPS (Global Positioning System) function to an elderly person or a child. Such wireless communication apparatuses are installed in large quantities at various locations, making it essential that battery replacement and recharge are not time-consuming. For this reason, a possible approach would be to apply energy harvesting to these wireless communication apparatuses. Energy harvesting refers to a technology that converts energy existing around us such as vibration, light, and heat into electric power and is also called an environmental power generation technology.

The use of this energy harvesting provides an advantage of eliminating the need for batteries in wireless communication apparatuses. However, constant and stable power generation is a difficult task, and a situation where information cannot be transmitted due to shortage of electric power may arise in some cases. For this reason, a technology that receives electric power distributed wirelessly from an external apparatus and stores received power in the case of shortage of electric power has been proposed (refer, for example, to PTL 1).

CITATION LIST

Patent Literature

[PTL 1]
Japanese Patent Laid-Open No. 2012-205388

SUMMARY

Technical Problems

In the above conventional technology, an electric operating end for controlling a valve opening position determines a destination to which electric power is to be distributed, according to a level of electric power stored, and issues an instruction that electric power be distributed. In this case, however, although the electric power storage levels even out in a fair manner among the apparatuses, it is difficult to guarantee the operation of each apparatus. It becomes difficult to manage a wireless communication apparatus that repeats its transmission through wireless communication, from other apparatus once transmission ceases, resulting in inconvenience for the system as a whole.

The present technology has been devised in light of the foregoing, and it is an object of the present technology to distribute electric power among wireless communication apparatuses while, at the same time, maintaining an electric power level required to operate a wireless communication function in the wireless communication apparatus.

Solution to Problems

The present technology has been devised to solve the above problems, and a first aspect thereof is a wireless communication apparatus that includes an electric power storage section, a wireless communication section, and a control section. The electric power storage section stores electric power. The wireless communication section engages in wireless communication with other wireless communication apparatuses by using electric power stored in the electric power storage section. The control section performs control such that electric power stored in the electric power storage section is passed to or from the other wireless communication apparatuses according to a priority level assigned to each of the wireless communication apparatuses, by using the electric power level required to operate the wireless communication section as a threshold. This brings about an action of passing to or from the other wireless communication apparatuses according to the priority level assigned to each of the wireless communication apparatuses, by using the electric power level required to operate the wireless communication section as a threshold.

Also, in this first aspect, the control section may perform control such that if the electric power storage level in the electric power storage section is larger than that required to operate the wireless communication section, electric power is distributed to the other wireless communication apparatuses, and if the electric power storage level in the electric power storage section is smaller than that required to operate the wireless communication section, distribution of electric power from the other wireless communication apparatuses is accepted. This brings about an action of controlling whether to distribute electric power by using the electric power level required to operate the wireless communication section as a threshold or to accept distribution of electric power.

Also, in this first aspect, the control section may perform control such that electric power is distributed from the wireless communication apparatus with the low priority level to the wireless communication apparatus with the high priority level on the basis of the priority level assigned to the wireless communication apparatus to which electric power is to be distributed. This brings about an action of distributing electric power according to the priority level.

Also, in this first aspect, the greater the shortage of electric power required to operate the wireless communication section, the larger the value assigned as the priority level may be. This brings about an action of distributing electric power preferentially to the wireless communication apparatus in significant shortage of electric power required to operate a wireless communication section.

Also, in this first aspect, the shorter the time to next transmission, the larger the value assigned as the priority level may be. This brings about an action of distributing electric power preferentially to the wireless communication apparatus with a short time available before next transmission.

Also, in this first aspect, a large value may be assigned as the priority level to a wireless communication apparatus representing each predetermined group. This brings about an action of distributing electric power preferentially to a representative wireless communication apparatus of each group.

Also, in this first aspect, the group may be formed according to position coordinates of the wireless communication apparatuses. This brings about an action of distributing electric power preferentially to a representative wireless communication apparatus among those in proximity.

Also, in this first aspect, an electric power distribution determination section that determines the electric power level to be passed, on the basis of the electric power storage level of each of the electric power storage sections and the priority levels of the other wireless communication apparatuses and the own wireless communication apparatus may further be included. This brings about an action of determining the electric power level to be passed.

Also, in this first aspect, a power generation section for generating electric power may further be included, and the power generation section may store the electric power generated by the power generation section. This brings about an action of storing electric power generated within the wireless communication apparatus.

Also, in this first aspect, a sensor for measuring an ambient environment may further be included, and the wireless communication section may transmit sensing results measured by the sensor, through wireless communication. This brings about an action of transmitting sensing results measured within the wireless communication apparatus, through wireless communication.

Also, a second aspect of the present technology is a wireless communication apparatus, an electric power distribution control method thereof, and a program. The wireless communication apparatus includes a wireless communication section, a control section, and an electric power distribution determination section. The wireless communication section receives a notice regarding electric power storage levels of electric power storage sections of other wireless communication apparatuses. The control section assigns priority levels to the other wireless communication apparatuses. The electric power distribution determination section determines the electric power level to be passed to or from the other wireless communication apparatuses, according to the priority level assigned to each of the wireless communication apparatuses, in order to control passing of electric power stored in the electric power storage section, by using the electric power level required to operate a wireless communication section of the wireless communication apparatus as a threshold. This brings about an action of passing electric power to or from other wireless communication apparatuses according to the priority level assigned to each of the wireless communication apparatuses, by using the electric power level required to operate the wireless communication section as a threshold.

Advantageous Effects of Invention

The present technology can achieve an excellent effect of permitting distribution of electric power between apparatuses while, at the same time, maintaining an electric power level required to operate a wireless communication function. It should be noted that the effects described herein are not necessarily limited and may be any one of the effects described in the present disclosure.

BRIEF DESCRIPTION OF DRAWINGS

FIGS. 10A and 10B depict diagrams illustrating a specific example of an electric power level for electric power distribution in the first embodiment of the present technology.

FIG. 18 is a diagram illustrating a configuration example of a field of the payload 640 of an electric power storage level notice frame of a third embodiment of the present technology.

FIGS. 22A, 22B, 22C, and 22D depict diagrams illustrating a specific example of an electric power level for electric power distribution in the third embodiment of the present technology.

FIGS. 26A and 26B depict diagrams illustrating a specific example of an electric power level for electric power distribution in the fourth embodiment of the present technology.

FIG. 30 is a sequence diagram illustrating an example of a processing flow of the wireless communication system of the sixth embodiment of the present technology.

DESCRIPTION OF EMBODIMENTS

A description of modes for carrying out the present technology (hereinafter referred to as embodiments) will be given below. The description will be given in the following order.

Figure 1:
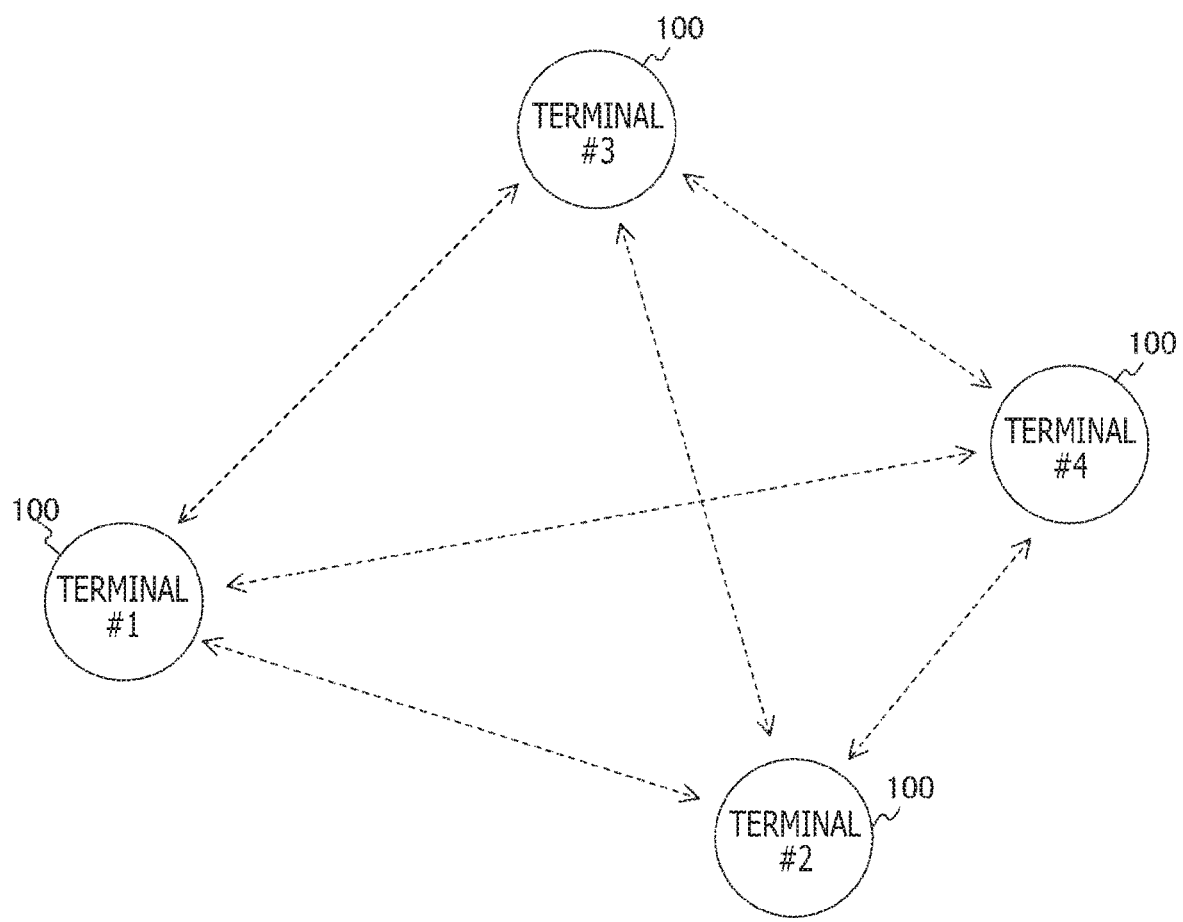
FIG. 1 is a diagram illustrating an example of an overall configuration of a wireless communication system of a first embodiment of the present technology.

1. First embodiment (example in which each terminal makes a determination for electric power distribution)
2. Second embodiment (example in which the control station makes a determination for electric power distribution)
3. Third embodiment (example in which priority is given to the terminal with shorter time to perform next transmission)
4. Fourth embodiment (example in which priority is given to the terminal representing a group)
5. Fifth embodiment (example in which a material used for power generation is distributed)
6. Sixth embodiment (example in which the power generation section is shared in the entire wireless communication system) CL 1. First Embodiment Wireless Communication System FIG. 1 is a diagram illustrating an example of an overall configuration of a wireless communication system of a first embodiment of the present technology.

In the wireless communication system of the first embodiment, a plurality of terminals 100 acquires information with sensors on a regular basis and transmits acquired data through wireless communication. Also, the terminals 100 exchange control data used for distribution of electric power as well as electric power with the other terminals 100 present in the wireless communication system.

In this example, it is assumed that there is a mesh network in which four terminals #1 to #4 are operating autonomously and that the terminals recognize the existence of each other and are synchronous with each other. Then, as will be described below, the terminals notify each other of electric power storage levels of their electric power storage sections and determine electric power levels to be distributed, on the basis of the electric power storage levels, for distribution of electric power. The terminals that have received distribution of electric power store that electric power in their electric power storage sections.

Configuration of the Terminal

Figure 2:
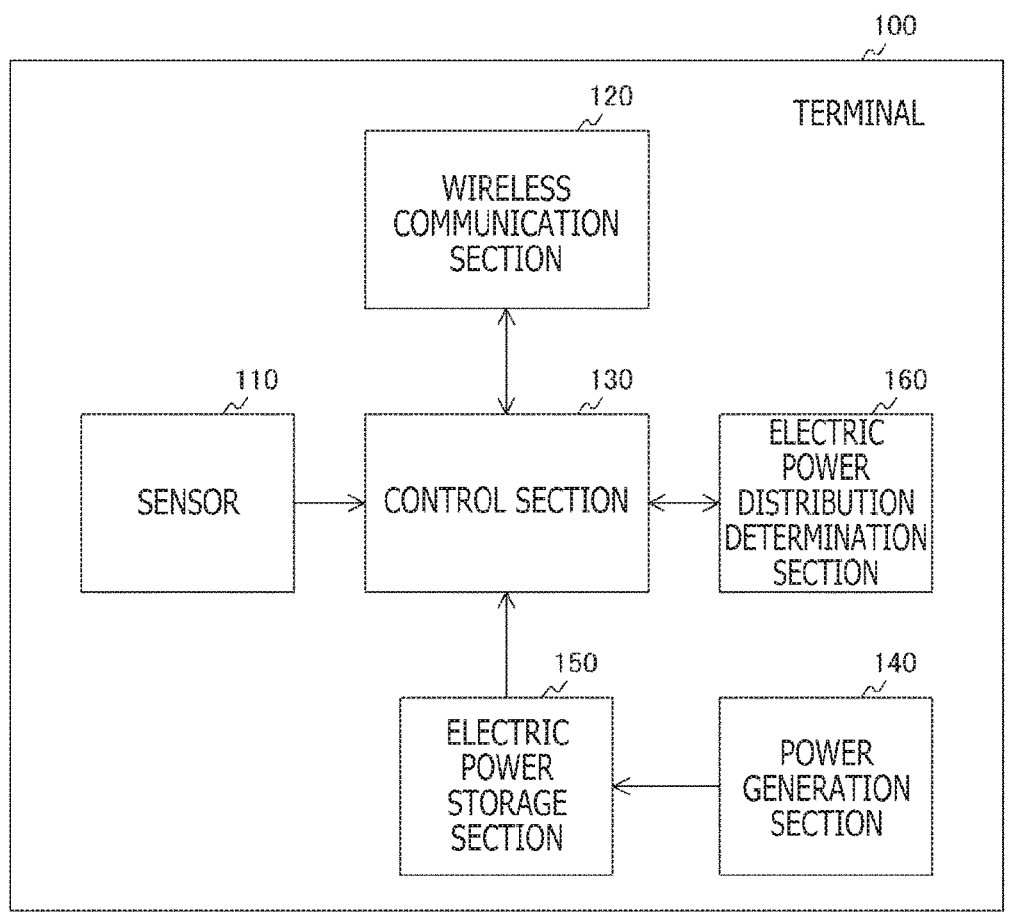
FIG. 2 is a diagram illustrating a configuration example of a terminal 100 of the first embodiment of the present technology.

FIG. 2 is a diagram illustrating a configuration example of the terminal 100 of the first embodiment of the present technology.

The terminal 100 of this first embodiment includes a sensor 110, a wireless communication section 120, a control section 130, a power generation section 140, an electric power storage section 150, and an electric power distribution determination section 160.

The sensor 110 measures (senses) an ambient environment of the terminal 100. Possible examples of the sensor 110 include a temperature sensor, a humidity sensor, an acceleration sensor, and a GPS for measuring position and time of day.

The wireless communication section 120 exchanges wireless signals (engages in wireless communication) with the other terminals 100 according to a predetermined frame format.

The power generation section 140 converts ambient energy such as heat, wind, or light into electric power. A possible example of the power generation section 140 includes a solar panel that generates electric power from sunlight.

The electric power storage section 150 stores electric power. The electric power storage section 150 stores not only electric power generated by the power generation section 140 but also electric power distributed from the other terminal 100.

The control section 130 not only controls the wireless communication section 120 to carry out transmission but also generates a transmission frame. Also, the control section 130 performs control associated with distribution of electric power to or from the other terminal 100. That is, the control section 130 performs control such that electric power is distributed or distribution of electric power is received, according to the electric power storage level of the electric power storage section 150.

The electric power distribution determination section 160 determines the electric power level to be distributed, on the basis of the electric power levels stored in the electric power storage sections 150 of the respective terminals 100 of the wireless communication system. It should be noted that, as will be described below, each terminal 100 is assigned a priority level and that the electric power distribution determination section 160 determines the electric power level such that electric power is distributed according to this priority level.

Configuration of the Frame

Figure 3:
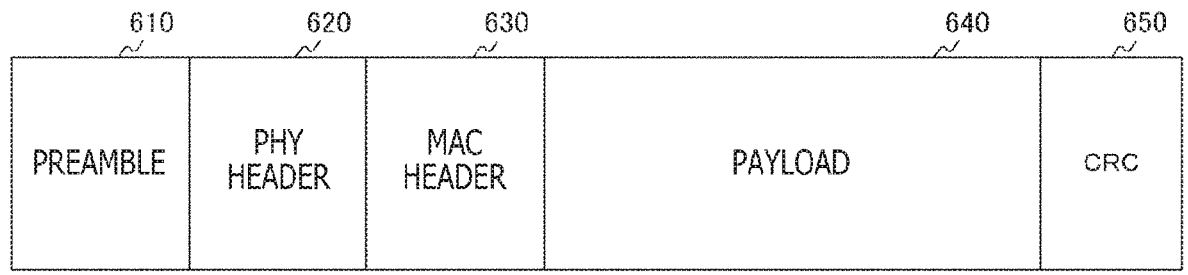
FIG. 3 is a diagram illustrating a configuration example of a frame exchanged between the terminals 100 of the first embodiment of the present technology.

FIG. 3 is a diagram illustrating a configuration example of a frame exchanged between the terminals 100 of the first embodiment of the present technology. This frame includes a preamble 610, a PHY header 620, a MAC header 630, a payload 640, and a CRC 650.

The preamble 610 is a bit string having a pattern determined in advance by a standard. The preamble 610 is provided at the beginning of the frame and used by the receiving side for signal detection and frame synchronization.

The PHY header 620 is a header that stores information regarding a physical layer frame. Examples of this information regarding a physical layer frame include a length of the part of the field subsequent to the PHY header 620 and a modulation scheme. The receiving side can receive the subsequent part of the field according to information of the PHY header 620.

The MAC header 630 is a header of a MAC layer (Media Access Control Layer). The MAC header 630 includes not only address information of a transmitter and a receiver but also types of information stored in the payload 640.

The payload 640 is data itself to be transmitted. In this embodiment, for example, in the case of a control frame for determining electric power distribution, an electric power storage level or other information is stored. Also, in the case of an information frame transmitted on a regular basis, information acquired from the sensor 110 is stored.

The CRC 650 is a CRC (Cyclic Redundancy Check) code for detecting frame errors.

Figure 4:
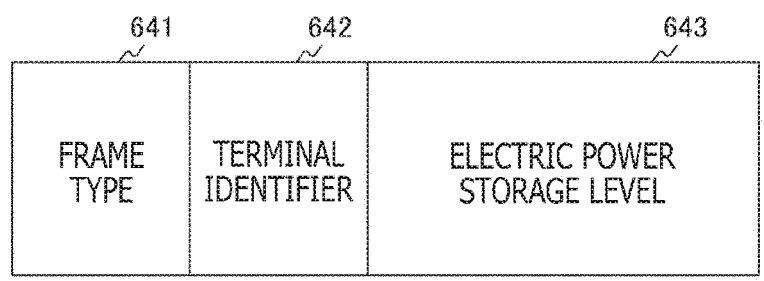
FIG. 4 is a diagram illustrating a configuration example of a field of a payload 640 in an electric power storage level notice frame of the first embodiment of the present technology.

FIG. 4 is a diagram illustrating a configuration example of a field of the payload 640 in an electric power storage level notice frame of the first embodiment of the present technology.

This electric power storage level notice frame is used to inform external equipment of the electric power level stored in the electric power storage section 150 of the terminal 100. This electric power storage level notice frame includes fields, i.e., a frame type 641, a terminal identifier 642, and an electric power storage level 643.

The frame type 641 is a field that indicates the type of this frame. In this example, the field indicates that this frame is an electric power storage level notice frame.

The terminal identifier 642 indicates the ID (identifier) of the terminal 100 that transmits this frame.

The electric power storage level 643 indicates the current electric power storage level of the electric power storage section 150 of the terminal 100 that transmits this frame.

As this electric power storage level notice frame is transmitted by broadcast, one's own electric power storage level can be informed to all the terminals 100 of the wireless communication system.

Figure 5:
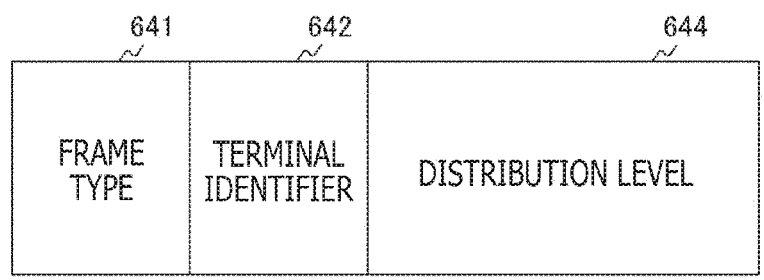
FIG. 5 is a diagram illustrating a configuration example of a field of the payload 640 in an electric power distribution notice frame of the first embodiment of the present technology.

FIG. 5 is a diagram illustrating a configuration example of a field of the payload 640 in an electric power distribution notice frame of the first embodiment of the present technology.

This electric power distribution notice frame is individually transmitted by unicast to the terminal 100 that will receive distribution of electric power ahead of the distribution of electric power. This electric power distribution notice frame includes fields, i.e., the frame type 641, the terminal identifier 642, and a distribution level 644.

The frame type 641 and the terminal identifier 642 are similar to those of the electric power storage level notice frame described above. That is, the frame type 641 indicates that this frame is an electric power distribution notice frame. Also, the terminal identifier 642 indicates the identifier of the terminal 100 from which electric power will be distributed. The distribution level 644 is the electric power level to be distributed by subsequent distribution of electric power.

The terminal 100 that has received this electric power distribution notice frame goes on standby for distribution of electric power from the terminal 100 specified by the terminal identifier 642.

Operation

Figure 6:
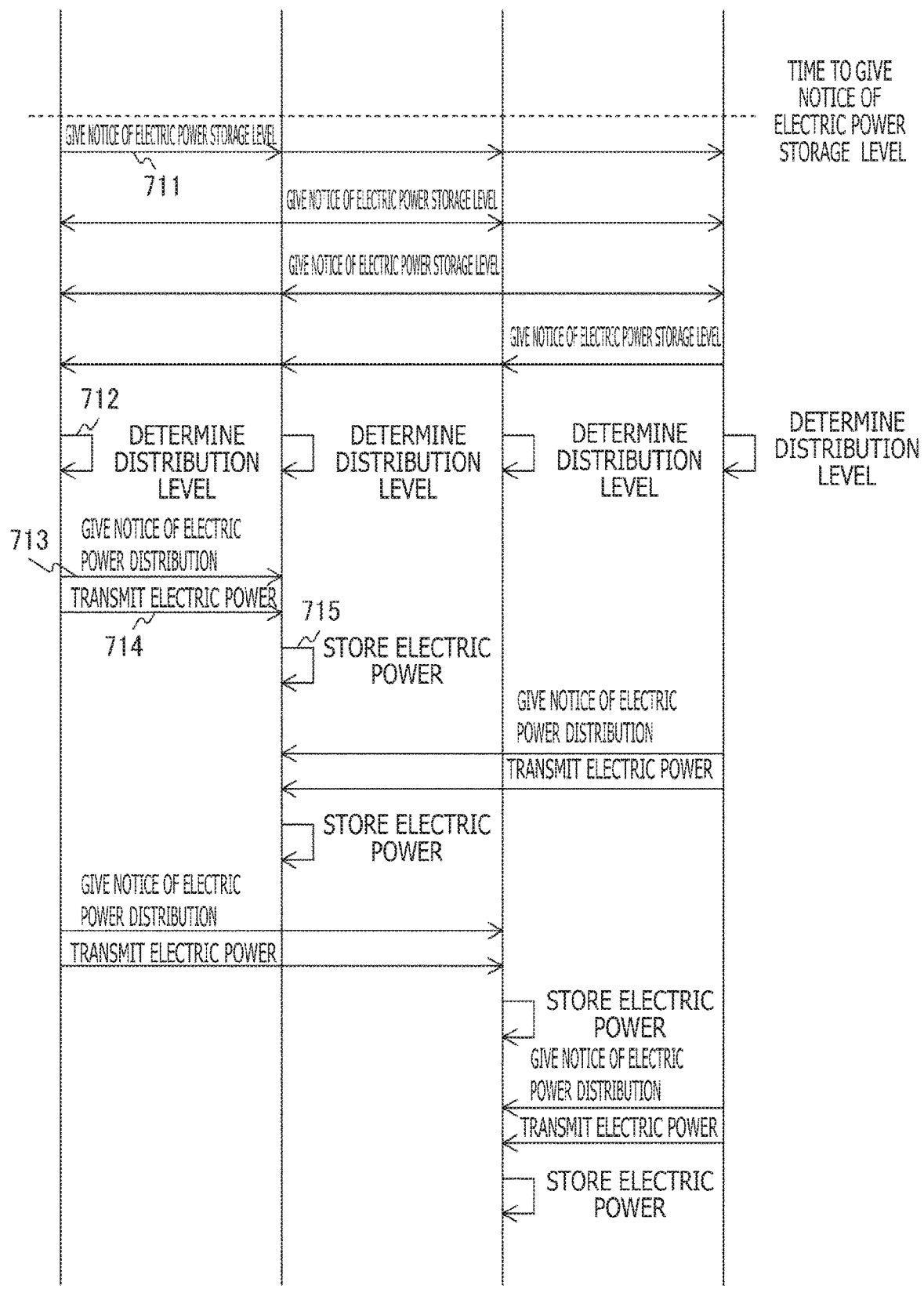
FIG. 6 is a sequence diagram illustrating an example of a processing flow of the wireless communication system of the first embodiment of the present technology.

FIG. 6 is a sequence diagram illustrating an example of a processing flow of the wireless communication system of the first embodiment of the present technology.

Here, it is assumed that the four terminals #1 to #4 of the wireless communication system are synchronous with each other. It should be noted that synchronization may be achieved by conducting signaling between the terminals or by acquiring time-of-day information with use of a GPS.

First, when it is time to give notice of electric power storage levels, the terminals #1 to #4 each transmit electric power storage level notices (711). This electric power storage level notice is given by transmitting the above electric power storage level notice frame by broadcast.

Next, the terminals #1 to #4 determine whether or not to distribute electric power stored in themselves, on the basis of the electric power storage level notice received. Then, in the case where electric power is to be distributed, the distribution level is determined (712).

The terminal that distributes electric power transmits an electric power distribution notice to the target terminal that will receive distribution of electric power (713). This electric power distribution notice is given by transmitting the above electric power distribution notice frame by unicast. In this example, the terminals #1 and #4 are assumed to distribute electric power to the terminals #2 and #3.

The terminals #1 and #4 transmit electric power after giving the electric power distribution notice (714). The terminals #2 and #3 that have received this electric power store the electric power in their electric power storage sections 150 (715).

Figure 7:
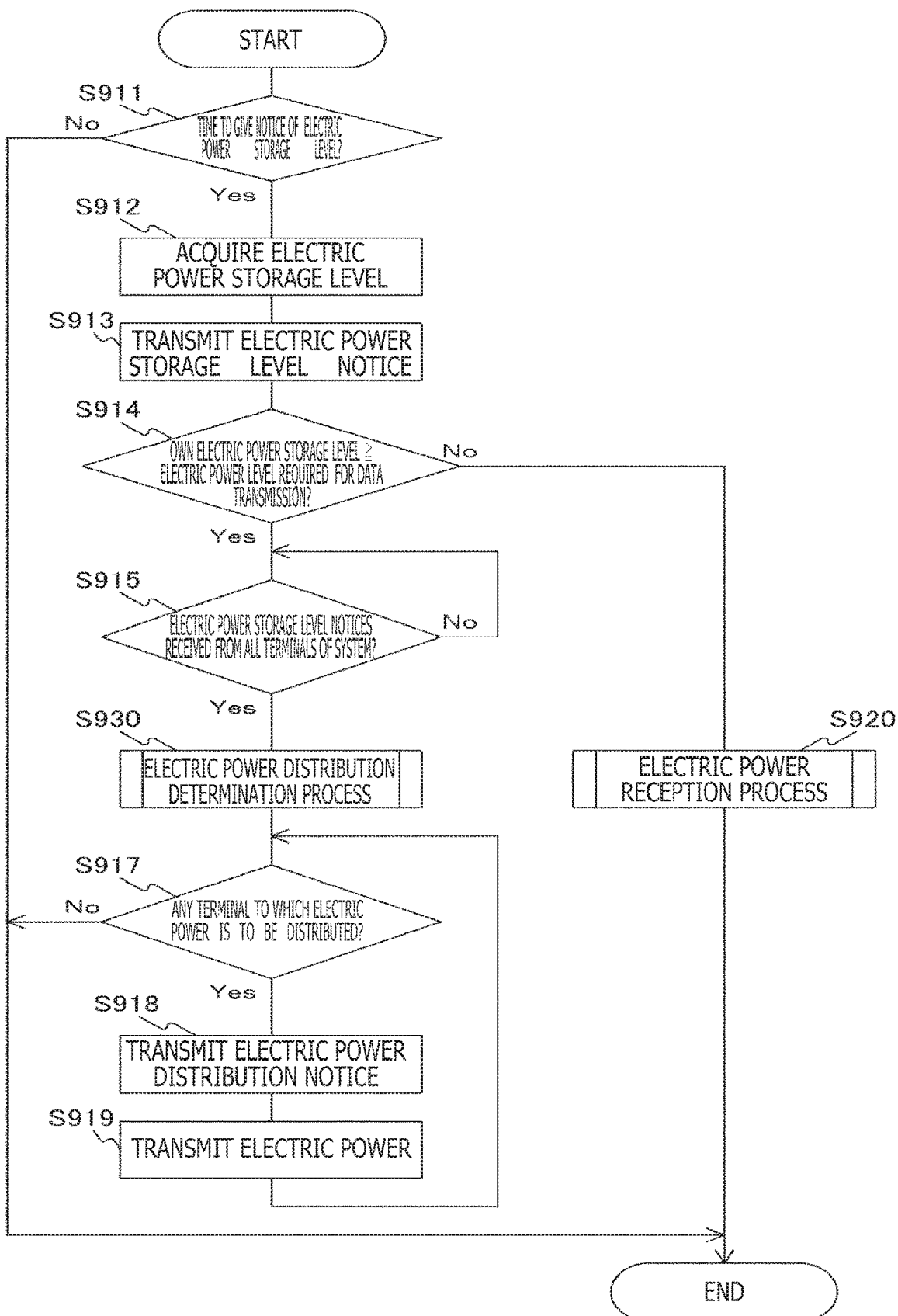
FIG. 7 is a flowchart illustrating an example of a processing procedure of the terminal 100 of the first embodiment of the present technology.

FIG. 7 is a flowchart illustrating an example of a processing procedure of the terminal 100 of the first embodiment of the present technology.

When it is time to give notice of an electric power storage level (Yes in step S911), the electric power distribution determination section 160 acquires the electric power storage level of the electric power storage section 150 of its own (step S912), informing the control section 130 of the electric power storage level. The control section 130 generates an electric power storage level notice frame on the basis of information acquired from the electric power distribution determination section 160. The wireless communication section 120 transmits the electric power storage level notice frame (step S913).

Next, the electric power distribution determination section 160 determines whether or not its electric power storage level is equal to or exceeds an electric power level required for data transmission (step S914). In the case where the electric power storage level is equal to or exceeds the electric power level required for data transmission (Yes in step S914), the electric power distribution determination section 160 receives electric power storage level notices transmitted from the other terminals 100 of the wireless communication system so as to distribute an electric power surplus to the other terminals 100 (step S915).

The wireless communication section 120 and the control section 130 receive and demodulate electric power storage level notices, to supply the acquired data to the electric power distribution determination section 160. When electric power storage level notices are received from all the terminals 100 of the system, the electric power distribution determination section 160 performs an electric power distribution determination process, determining not only whether or not to distribute electric power but also target terminals subject to distribution and distribution levels (step S930).

In the case where the terminal 100 to which electric power is to be distributed is present after the electric power distribution determination process (Yes in step S917), an electric power distribution notice is transmitted (step S918), followed by transmission of electric power (step S919). When the series of processes is completed for all the terminals 100 to which electric power is to be distributed, the terminal 100 is finished with its processes.

On the other hand, in the case where the electric power storage level is smaller than the electric power level required for data transmission, an electric power reception process is performed to receive electric power distributed from the other terminal 100 (step S920).

Figure 8:
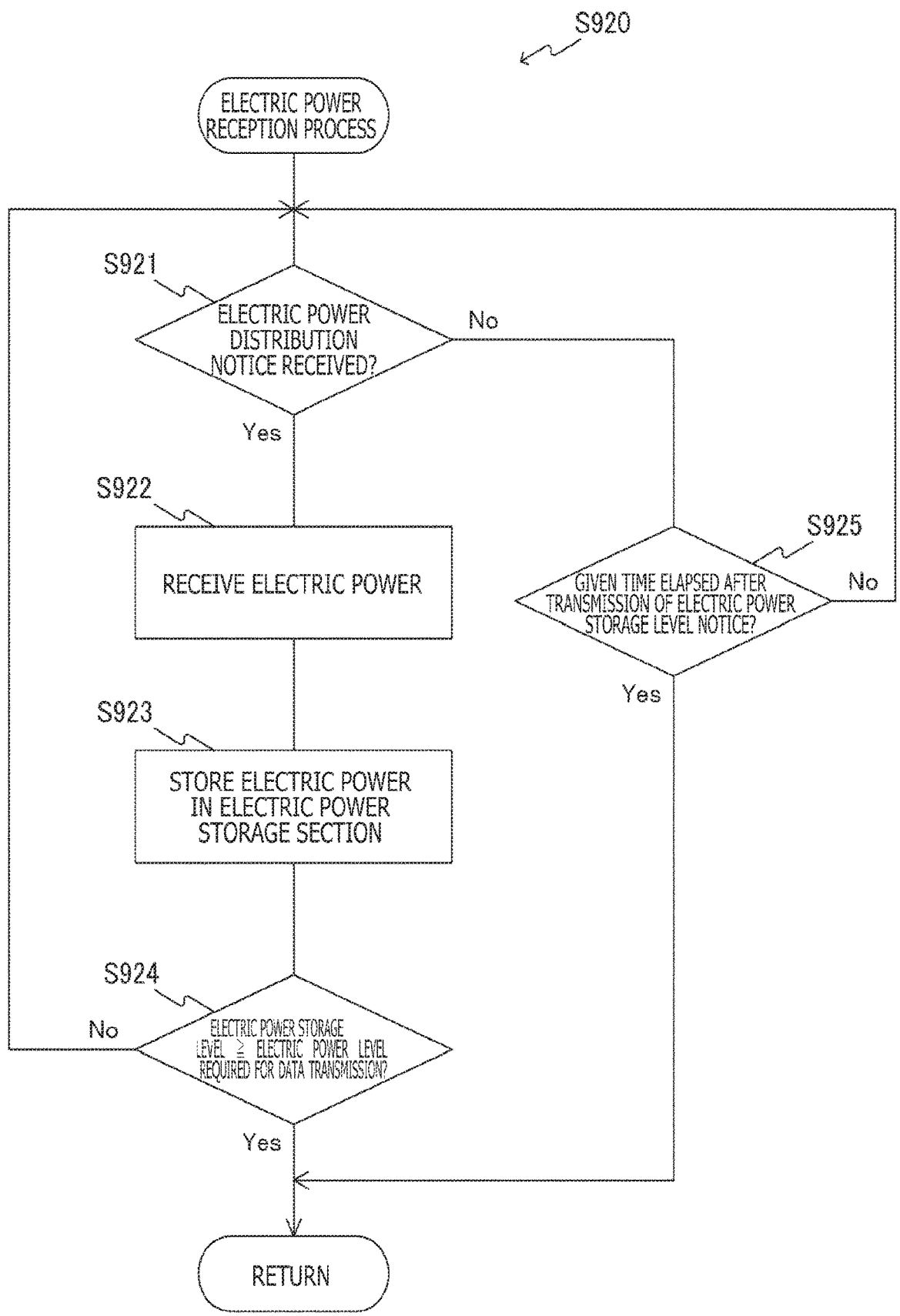
FIG. 8 is a flowchart illustrating an example of a processing procedure of an electric power reception process (step S920) performed by the terminal 100 of the first embodiment of the present technology.

FIG. 8 is a flowchart illustrating an example of a processing procedure of the electric power reception process (step S920) performed by the terminal 100 of the first embodiment of the present technology.

When an electric power distribution notice is received (Yes in step S921), the wireless communication section 120 and the control section 130 receive and demodulate the electric power distribution notice, supplying the acquired data to the electric power distribution determination section 160.

The electric power distribution determination section 160 acquires the terminal 100 from which electric power will be distributed (terminal identifier 642) and the electric power level that will be distributed (distribution level 644), on the basis of information stored in the electric power distribution notice received, to receive electric power (step S922). Then, the electric power distribution determination section 160 stores the received electric power in the electric power storage section 150 (step S923).

These processes are repeated until the electric power storage level of the electric power storage section 150 of the terminal 100 reaches an electric power level required for data transmission (step S924).

Also, in the case where a certain period of time has elapsed after transmission of an electric power storage level notice (Yes in step S925), it is determined that there is no electric power to be distributed, and the process is terminated even if the electric power storage level has yet to reach the electric power level required for data transmission.

Figure 9:
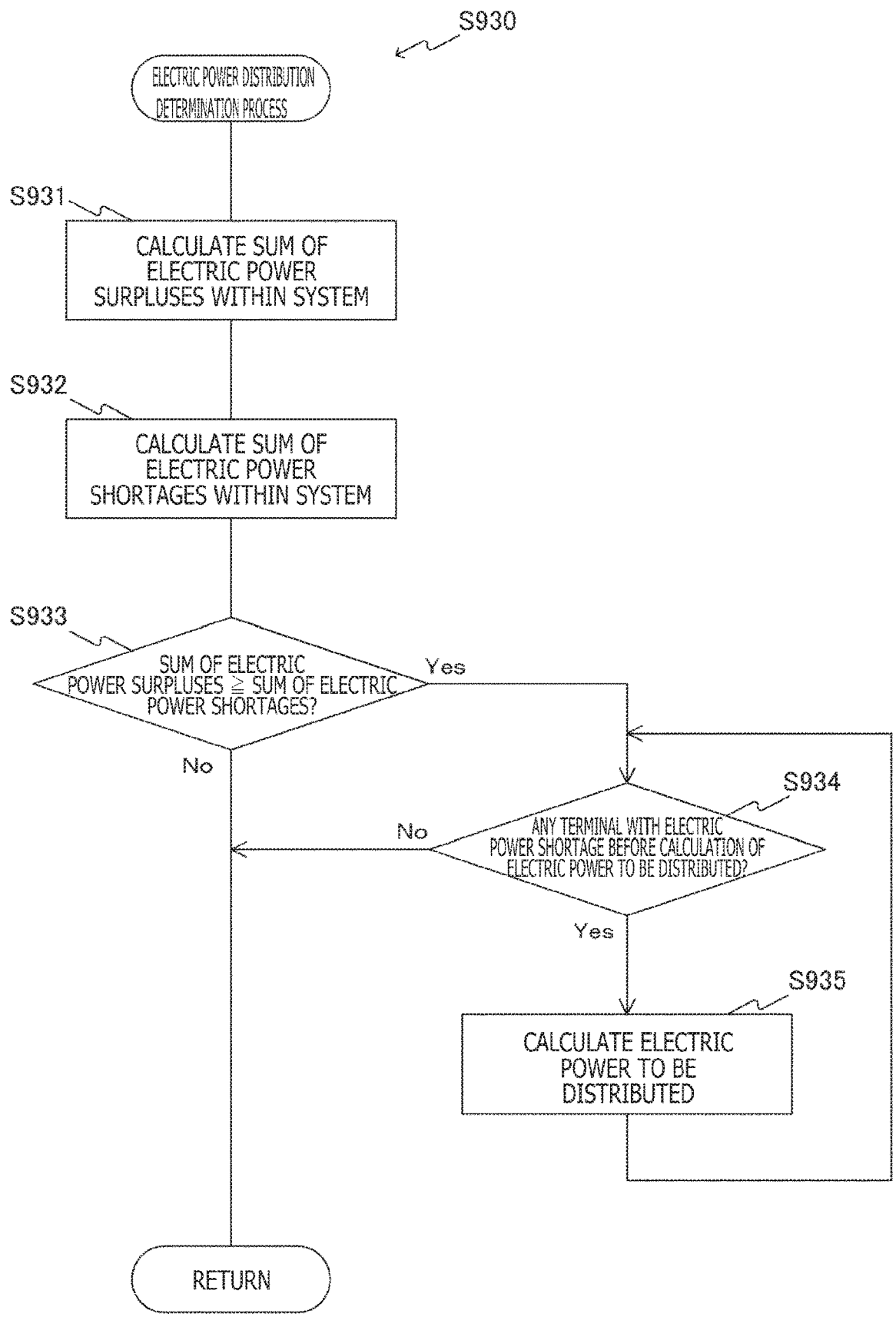
FIG. 9 is a flowchart illustrating an example of a processing procedure of an electric power distribution determination process (step S930) performed by the terminal 100 of the first embodiment of the present technology.

FIG. 9 is a flowchart illustrating an example of a processing procedure of an electric power distribution determination process (step S930) performed by the terminal 100 of the first embodiment of the present technology.

First, the electric power distribution determination section 160 calculates a sum of electric power surpluses and a sum of electric power shortages within the wireless communication system on the basis of the electric power storage level notice received (steps S931 and S932).

In the case where the sum of electric power surpluses is greater than the sum of electric power shortages (Yes in step S933), the electric power distribution determination section 160 calculates the electric power to be distributed (step S935) for all the terminals in shortage of electric power within the wireless communication system (Yes in step S934). On the other hand, in the case where the sum of electric power surpluses is smaller than the sum of electric power shortages (No in step S933), no electric power is distributed.

An electric power level Pshare to be distributed from a terminal 'x' having an electric power surplus to a terminal 'y' in shortage of electric power is calculated, for example, by the following formula. Here, Ptx is the electric power level required for data transmission, Px indicates the electric power storage level of the terminal 'x,' Py indicates the electric power storage level of the terminal 'y,' and Pshare_sum indicates the sum of electric power surpluses within the wireless communication system.

$$P\text{share}(x,y) = ((Px - Ptx)/P\text{share\_sum}) \times (Ptx - Py)$$

When the electric power level to be distributed to each of all the terminals in shortage of electric power within the wireless communication system is calculated on the basis of the above formula (No in step S934), this electric power distribution determination process is terminated.

Specific Example

FIGS. 10A and 10B depict diagrams illustrating a specific example of an electric power level for electric power distribution in the first embodiment of the present technology.

Here, it is assumed that, as illustrated in FIG. 10A, the electric power storage level of the electric power storage section 150 of the terminal 100 prior to electric power distribution is "50" for the terminal #1, "18" for the terminal #2, "24" for the terminal #3, and "40" for the terminal #4. Also, it is assumed that the electric power required for one data transmission by the wireless communication section 120 is "30." It should be noted that the electric power levels are treated here as relative values and have no unit.

That is, the electric power storage levels of the terminals #1 and #4 have already reached an electric power level required for data transmission whereas those of the terminals #2 and #3 have yet to reach the electric power level required for data transmission. For this reason, the terminals #1 and #4 distribution electric power, and the terminals #2 and #3 receive distribution of electric power. In this case, the terminal #2 is in highest shortage of electric power required for data transmission. Therefore, a higher priority level than that for the terminal #3 is assigned.

Specifically, the electric power to be distributed from the terminal #1 to the terminal #2 is obtained as follows by applying the above formula.

$$P\text{share}(1,2) = ((50-30)/(20+10)) \times (30-18) = 8$$

Also, the electric power to be distributed from the terminal #1 to the terminal #3 is obtained as follows.

$$P\text{share}(1,3)=((50-30)/(20+10))\times(30-24)=4$$

Also, the electric power to be distributed from the terminal #4 to the terminal #2 is obtained as follows.

$$P\text{share}(4,2)=((40-30)/(20+10))\times(30-18)=4$$

Also, the electric power to be distributed from the terminal #4 to the terminal #3 is obtained as follows.

$$P\text{share}(4,3)=((40-30)/(20+10))\times(30-24)=2$$

As a result, as illustrated in FIG. 10B, the electric power storage level of the electric power storage section 150 of the terminal 100 after electric power distribution is "38" for the terminal #1, "30" for the terminal #2, "30" for the terminal #3, and "34" for the terminal #4. That is, all the terminals #1 to #4 have electric power storage levels required for data transmission.

As described above, in the first embodiment of the present technology, each of the terminals 100 determines whether or not distribution of electric power is required and an electric power level to be distributed, thus allowing for distribution of electric power in an environment where the terminals 100 operate autonomously. The determination as to whether or not distribution of electric power is required is made by using an electric power level required to operate the wireless communication section as a threshold. Allowing for distribution of electric power within the wireless communication system eliminates the need to guarantee a power generation level that permits each terminal to transmit data without fail, thus providing an effect of facilitating manufacture of the power generation section and the power storage section in possession.

2. Second Embodiment

Wireless Communication System

Figure 11:
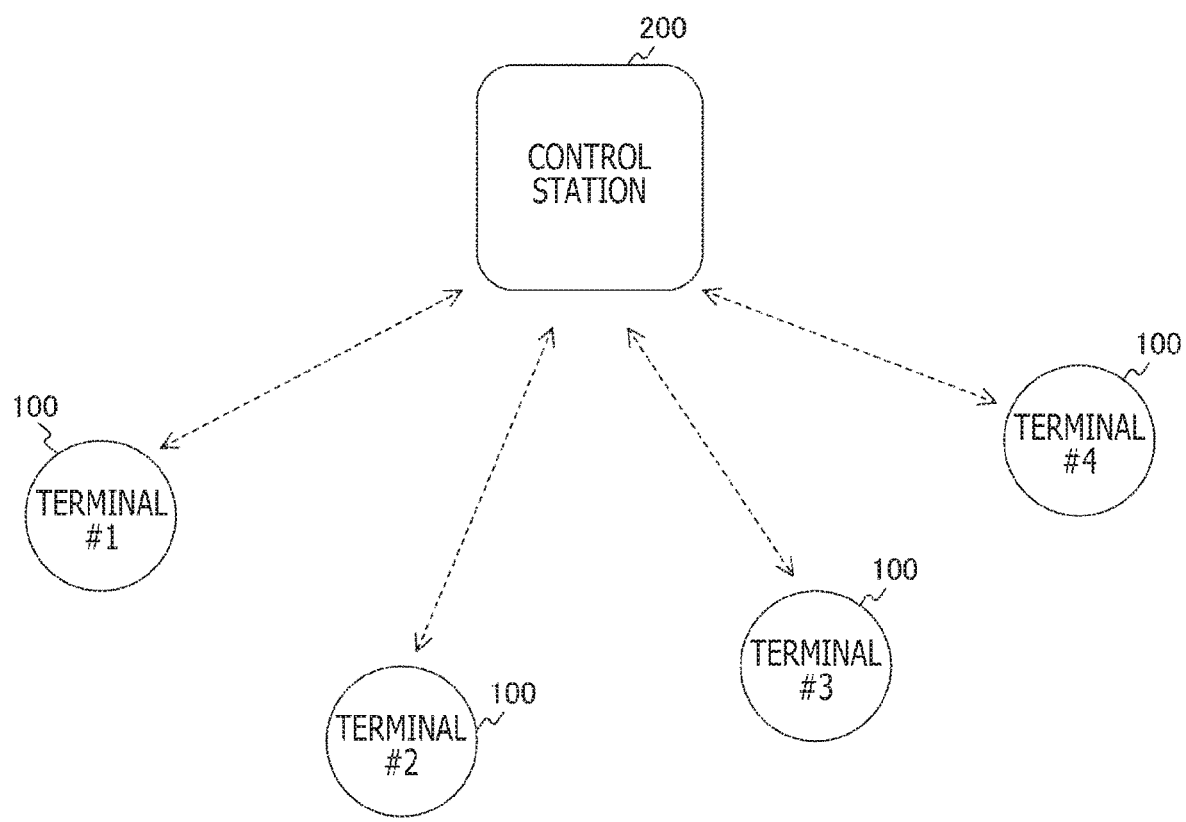
FIG. 11 is a diagram illustrating an example of an overall configuration of the wireless communication system of a second embodiment of the present technology.

FIG. 11 is a diagram illustrating an example of an overall configuration of the wireless communication system of a second embodiment of the present technology.

A description of a technique by which the plurality of terminals 100 autonomously determines distribution of electric power has been given in the first embodiment described above. In contrast, in this second embodiment, a case in which a control station 200 integrally manages distribution of electric power will be described.

In the wireless communication system of this second embodiment, the control station 200 is provided in addition to the four terminals #1 to #4. The control station 200 manages distribution of electric power to the terminals 100 within the wireless communication system. Therefore, while acquiring information with sensors on a regular basis and transmitting acquired data through wireless communication, the terminals 100 exchange control data used for distribution of electric power as well as electric power with the control station 200.

Configuration of the Terminal

Figure 12:
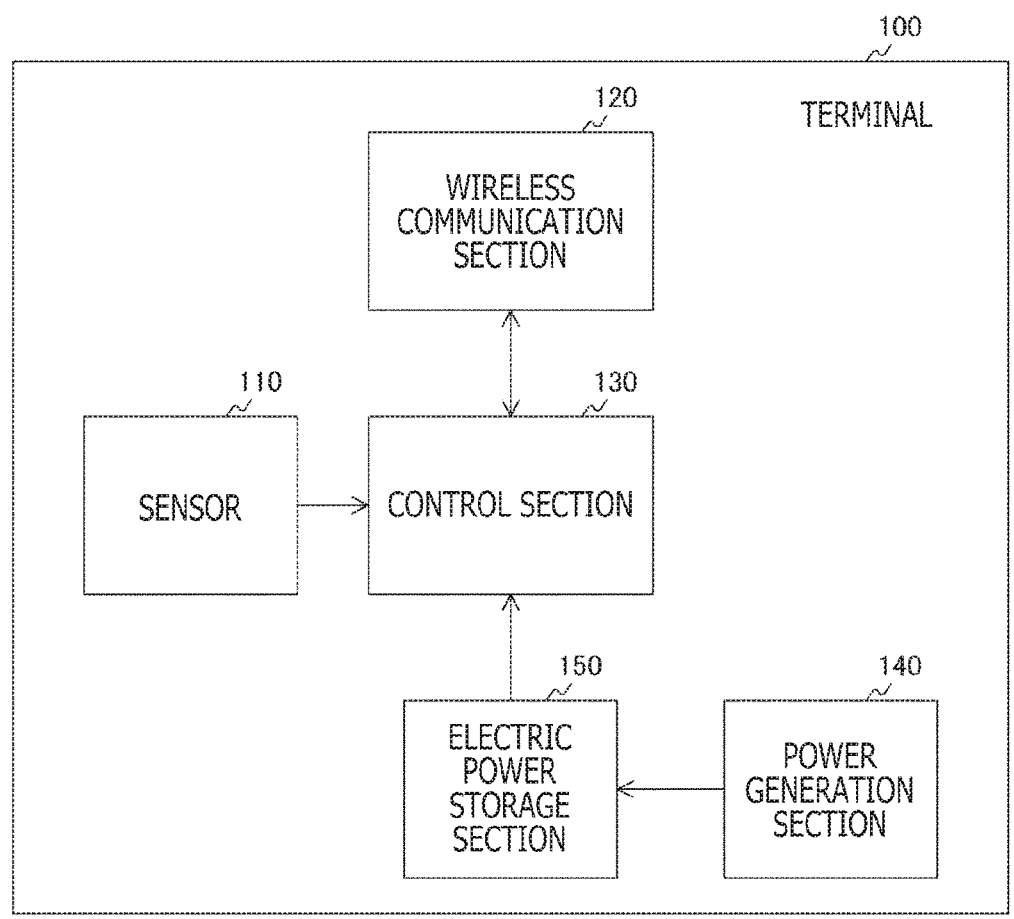
FIG. 12 is a diagram illustrating a configuration example of the terminal 100 of the second embodiment of the present technology.

FIG. 12 is a diagram illustrating a configuration example of the terminal 100 of the second embodiment of the present technology.

The terminal 100 of this second embodiment differs from the terminal 100 of the first embodiment described above in that the electric power distribution determination section 160 has been removed but is similar to the terminal 100 of the first embodiment in all other respects. Therefore, a detailed description will be omitted.

Configuration of the Control Station

Figures 13, 14:
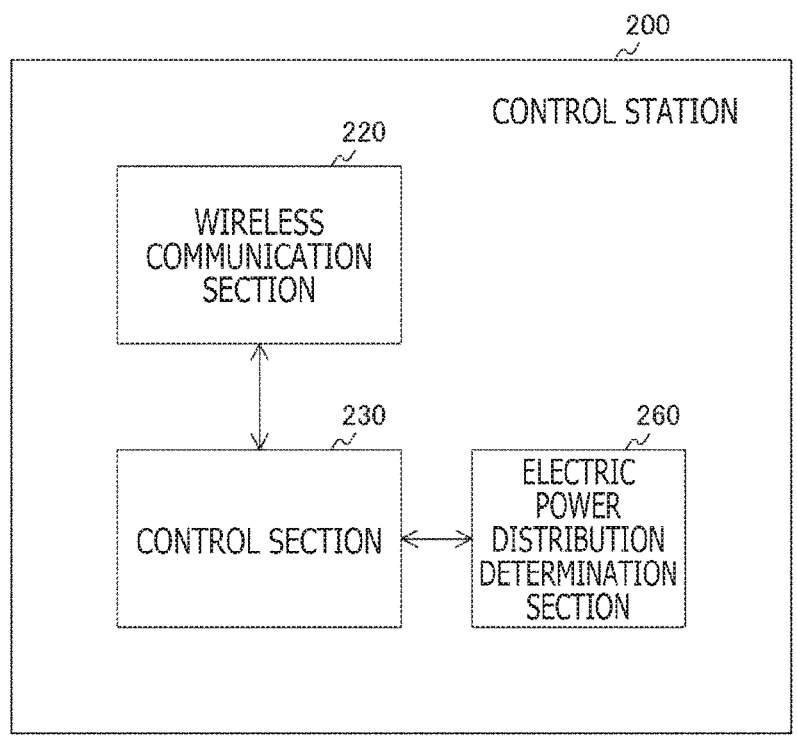
FIG. 13 is a diagram illustrating a configuration example of a control station 200 of the second embodiment of the present technology.
FIG. 14 is a diagram illustrating a configuration example of a field of the payload 640 of an electric power distribution instruction frame of the second embodiment of the present technology.

FIG. 13 is a diagram illustrating a configuration example of the control station 200 of the second embodiment of the present technology. The control station 200 includes a wireless communication section 220, a control section 230, and an electric power distribution determination section 260.

The wireless communication section 220 transmits and receives wireless signals according to a predetermined frame format.

The control section 230 not only controls the wireless communication section 220 to carry out transmission but also generates a transmission frame.

The electric power distribution determination section 260 determines not only whether or not to distribute electric power to the terminals 100 within the wireless communication system but also an electric power level to be distributed and so on.

Configuration of the Frame

FIG. 14 is a diagram illustrating a configuration example of a field of the payload 640 of an electric power distribution instruction frame of the second embodiment of the present technology. It should be noted that the configuration of the frame as a whole is similar to that of the first embodiment described above, and thus, a detailed description thereof will be omitted.

This electric power distribution instruction frame is used by the control station 200 to instruct the terminal 100 having an electric power surplus to distribute electric power. This electric power distribution instruction frame includes the frame type 641, the number of terminals subject to distribution 645, a terminal identifier 646, and a distribution level 647.

The frame type 641 is a field that indicates the type of this frame. In this example, the field indicates that this frame is an electric power distribution instruction frame.

The number of terminals subject to distribution 645 is a field that indicates the number of terminals 100 to which electric power is to be distributed. Following this field, the terminal identifier 646 and the distribution level 647 are stored for each of the terminals 100 in a number equal to that specified by the number of terminals subject to distribution 645.

The terminal identifier 646 is the terminal identifier of the terminal 100 that distributes electric power. The distribution level 647 is the level of electric power distributed by the terminal 100.

It should be noted that the electric power storage level notice frame and the electric power distribution notice frame are similar to those of the first embodiment described above. Therefore, a detailed description will be omitted.

Operation

Figure 15:
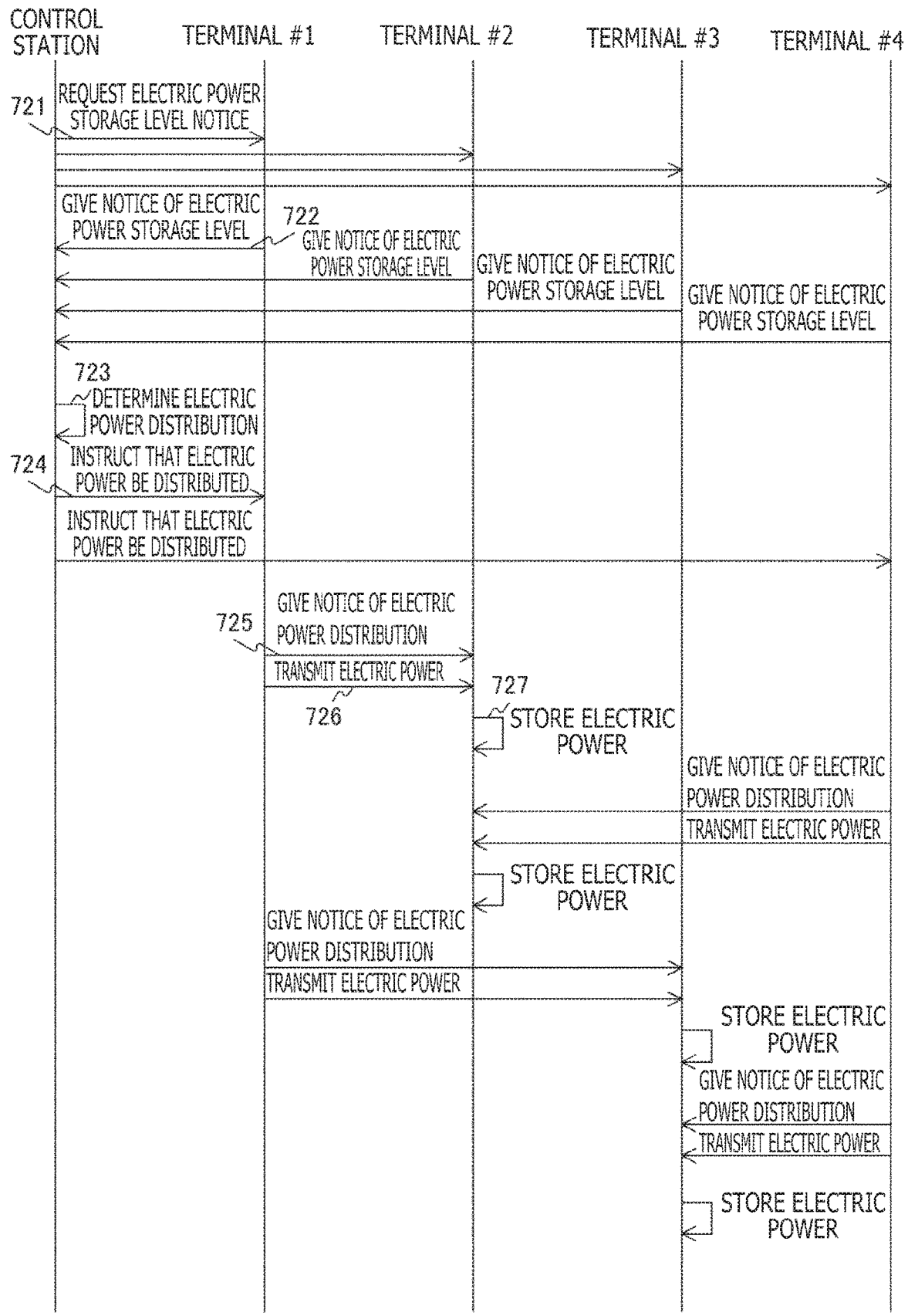
FIG. 15 is a sequence diagram illustrating an example of a processing flow of the wireless communication system of the second embodiment of the present technology.

FIG. 15 is a sequence diagram illustrating an example of a processing flow of the wireless communication system of the second embodiment of the present technology.

First, the control station 200 transmits a request for electric power storage level notice by broadcast (721). Each of the terminals #1 to #4 that has received this request for electric power storage level notice acquires the electric power storage level of its own electric power storage section 150, transmitting an electric power storage level notice to the control station 200 (722).

When electric power storage level notices are received from all the terminals #1 to #4 within the wireless communication system, the control station 200 performs the electric power distribution determination process, determining not only whether or not to distribute electric power but also target terminals subject to distribution and distribution level (723). Then, the control station 200 transmits an electric power distribution instruction to the terminal having an electric power surplus (724).

The terminal that has received the electric power distribution instruction first transmits an electric power distribution notice to the terminal subject to distribution of electric power, on the basis of information stored in the payload of the electric power distribution instruction (725), and then transmits electric power (726).

The terminal that has received the electric power distribution notice receives electric power and stores the received electric power in the electric power storage section 150 (727).

Figure 16:
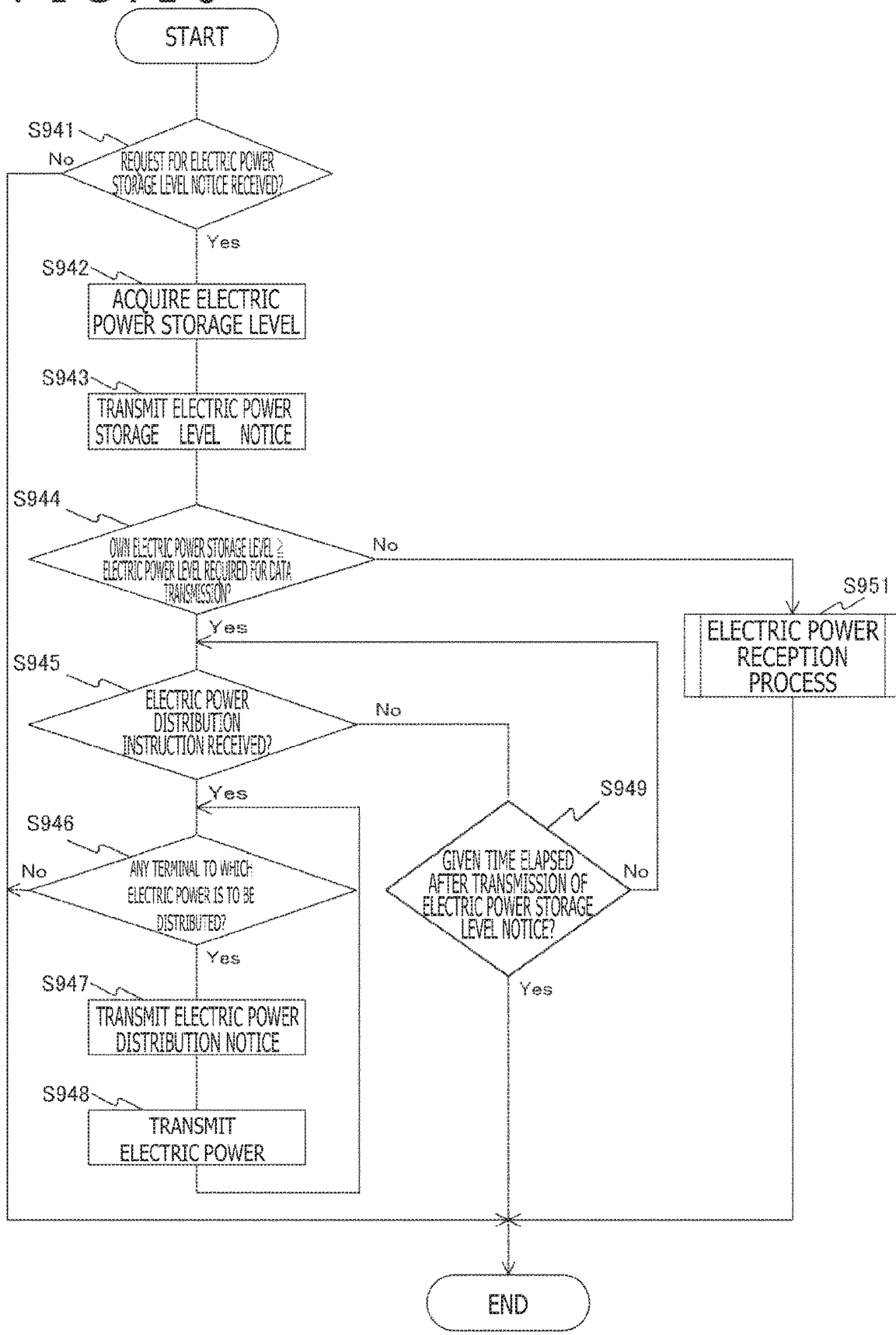
FIG. 16 is a flowchart illustrating an example of a processing procedure of the terminal 100 of the second embodiment of the present technology.

FIG. 16 is a flowchart illustrating an example of a processing procedure of the terminal 100 of the second embodiment of the present technology.

First, when a request for electric power storage level notice is received from the control station 200 (Yes in step S941), the terminal 100 acquires the electric power storage level of its own electric power storage section 150 (step S942), transmitting an electric power storage level notice to the control station 200 (step S943).

Then, in the case where its own electric power storage level is equal to or exceeds the electric power level required for data transmission (Yes in step S944), the terminal 100 receives an electric power distribution instruction (step S945) because it is likely that the terminal 100 will distribute electric power to other terminals. When an electric power distribution instruction is received (Yes in step S945), and in the case of presence of a terminal to which electric power is to be distributed (Yes in step S946), the terminal 100 transmits an electric power distribution notice to the target terminal (step S947) and transmits the specified distribution level of electric power (step S948). It should be noted that the terminal identifier of the terminal subject to electric power distribution and the distribution level are stored in the payload of the electric power distribution instruction, as described above.

At this time, in the case where an electric power distribution instruction has yet to be received even when a certain period of time has elapsed after transmission of an electric power storage level notice in step S943 (No in step S945; Yes in step S949), the terminal 100 determines that there is no need to distribution electric power, thus terminating the process.

On the other hand, in the case where its own electric power storage level is smaller than the electric power level required for data transmission (No in step S944), the terminal 100 performs an electric power reception process (step S951) because it is likely that electric power will be distributed from other terminals. This electric power reception process is similar in details to the electric power reception process of the first embodiment described above (step S920). Therefore, a detailed description will be omitted.

Figure 17:
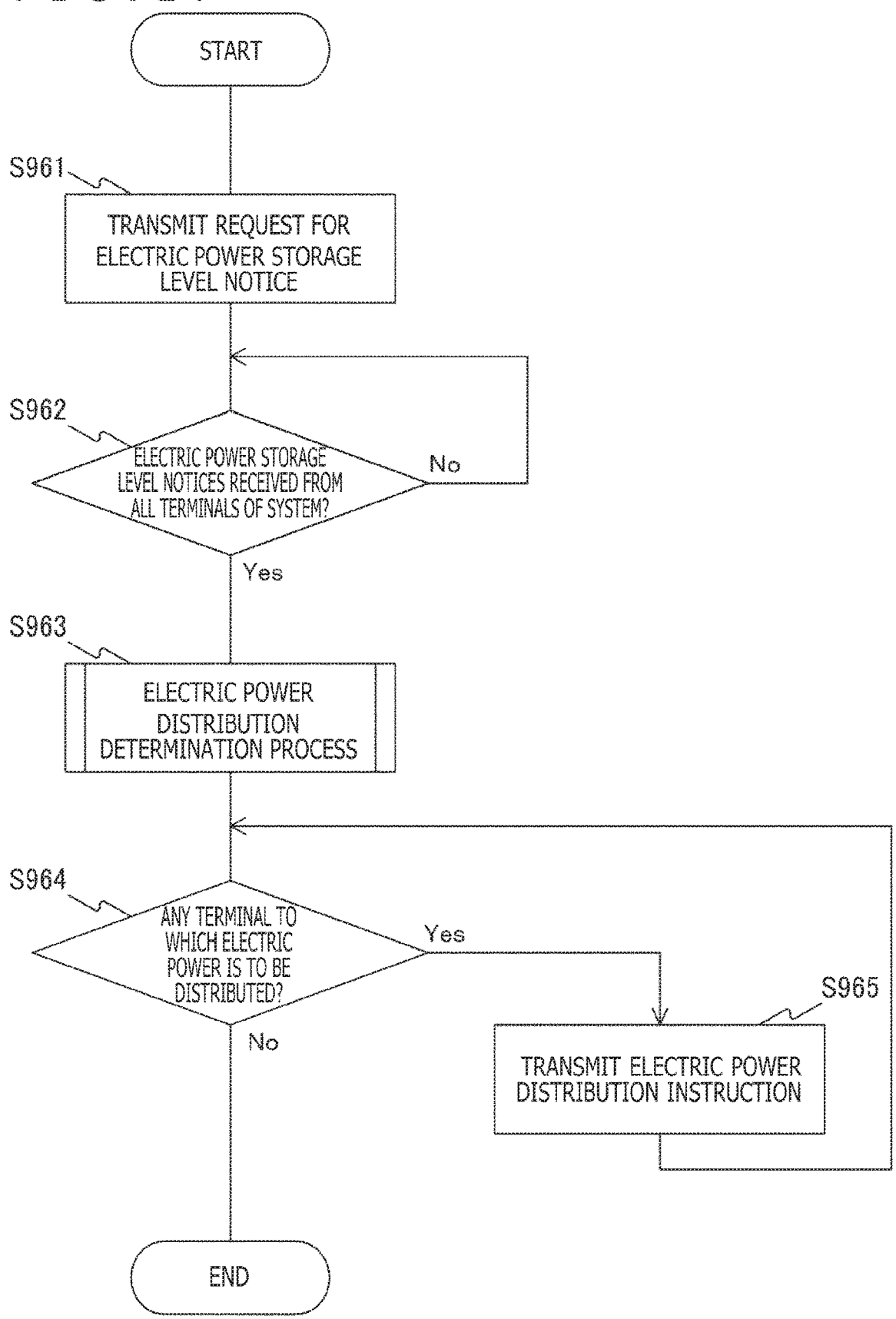
FIG. 17 is a flowchart illustrating an example of a processing procedure of the control station 200 of the second embodiment of the present technology.

FIG. 17 is a flowchart illustrating an example of a processing procedure of the control station 200 of the second embodiment of the present technology.

First, the control station 200 transmits a request for electric power storage level notice by broadcast (step S961).

Then, the control station 200 determines whether or not electric power storage level notices have been received from all the terminals within the wireless communication system (step S962). When electric power storage level notices are received from all the terminals (Yes in step S962), the control station 200 performs an electric power distribution determination process (step S963). This electric power distribution determination process is similar in details to the electric power distribution determination process of the first embodiment described above (step S930). Therefore, a detailed description will be omitted.

In the case where the terminal to which electric power is to be distributed is present after the electric power distribution determination process (Yes in step S964), the control station 200 transmits an electric power distribution instruction to the target terminal (step S965). The process is terminated when electric power distribution instructions are transmitted to all the terminals which are to distribute electric power (No in step S964).

As described above, in the second embodiment of the present technology, the control station 200 integrally determines how electric power is to be distributed, thus eliminating the need for each of the terminals 100 to perform the electric power distribution determination process. This contributes to reduced functionality of the terminals 100, thus providing an effect of facilitating the manufacture. Also, a process of achieving synchronization between the terminals 100 is no longer required, thus contributing to reduced control signaling.

It should be noted that, while an example in which an electric power distribution determination process similar to that of the first embodiment described above is used has been illustrated in the second embodiment, it is possible to perform control to reduce the number of times electric power is transmitted and received between the terminals 100 by allowing the control station 200 to integrally manage the task. In the above example, for example, it is possible to give instructions such that "12" worth of electric power, which is the shortage of the terminal #2, is distributed from the terminal #1 and that "6" worth of electric power, which is the shortage of the terminal #3, is distributed from the terminal #4. In this case, it is clear that the number of times electric power is transmitted and received has been reduced from four times to twice as compared to the case of receiving the distribution from different terminals. It should be noted, however, that the fact that the terminal #2 is assigned a higher priority level than that for the terminal #3 remains unchanged.

3. Third Embodiment

In the electric power distribution determination processes of the first and second embodiments described above, in the case where the sum of electric power surpluses is smaller than the sum of electric power shortages within the wireless communication system, no electric power is distributed. This may lead to a situation in which data transmission cannot be carried out on a regular basis due to an electric power shortage. For this reason, in a third embodiment, a description will be given with respect to a technique by which electric power is distributed in such a manner as to enable continued transmission even in the case where the sum of electric power surpluses falls short of the sum of electric power shortages by capitalizing on time available until next transmission is to be performed in the terminals 100.

It should be noted that the third embodiment relates to an electric power distribution determination process, and the assumed system configuration may be that of the first embodiment or that of the second embodiment. Therefore, the description of identical points will be omitted, with focus placed only on differences from the above explanation.

Configuration of the Frame

FIG. 18 is a diagram illustrating a configuration example of a field of the payload 640 of an electric power storage level notice frame of the third embodiment of the present technology.

The electric power storage level notice frame of this third embodiment is similar to those of the embodiments described above in that it includes fields, i.e., the frame type 641, the terminal identifier 642, and the electric power storage level 643, to notify external equipment of the electric power storage level of the electric power storage section 150 of the terminal 100.

It should be noted, however, that the electric power storage level notice frame of the third embodiment differs in that it further includes a field of time to next data transmission 648. The time to next data transmission 648 indicates time remaining until next data transmission is performed by the terminal 100. In the case where information acquired from the sensor 110 is transmitted on a regular basis, this transmission time can be obtained in advance. The shorter the time to next data transmission 648, the more urgent it is to store electric power up to the level required for transmission.

Operation

Figure 19:
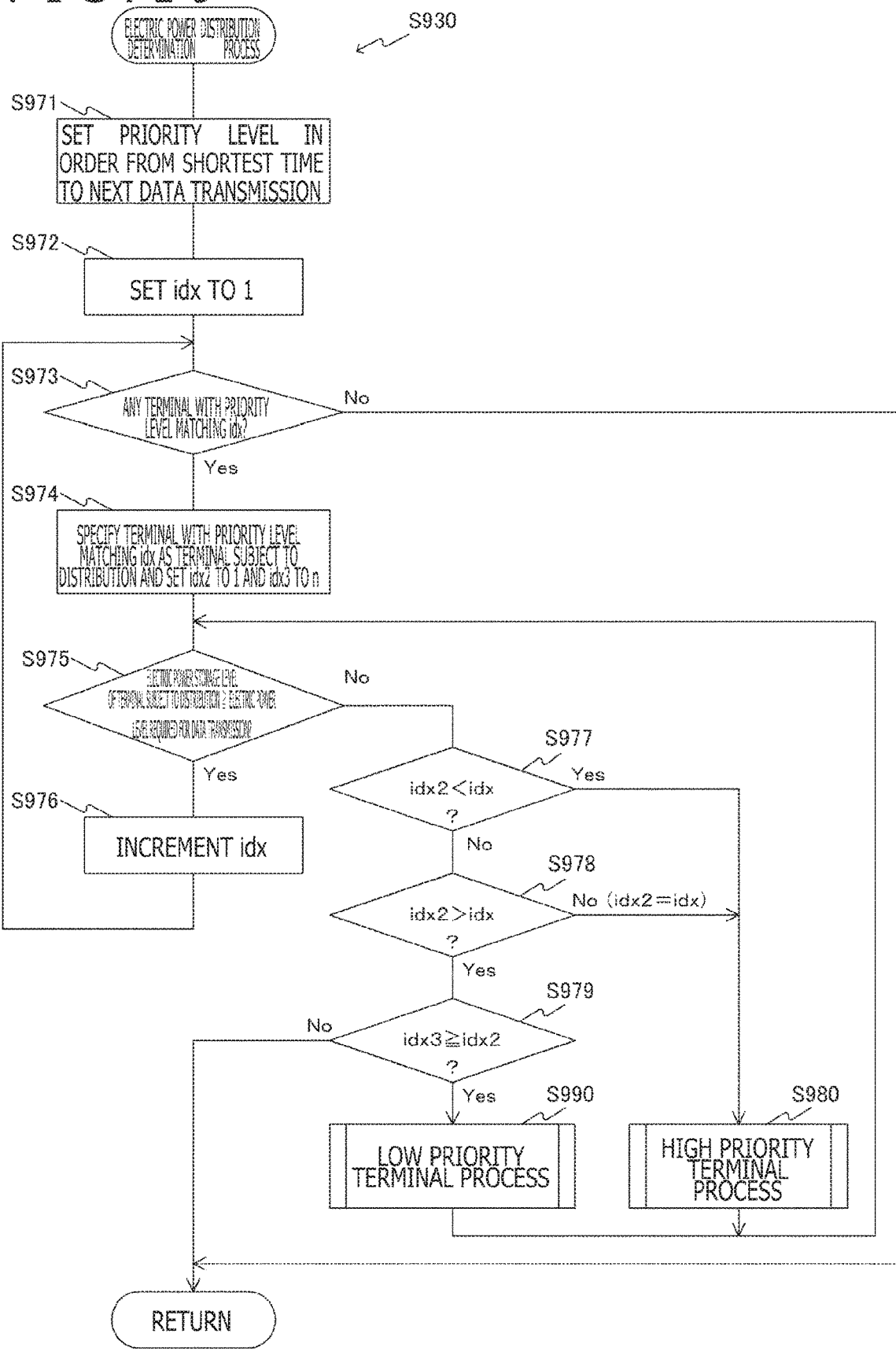
FIG. 19 is a flowchart illustrating an example of a processing procedure of the electric power distribution determination process in the third embodiment of the present technology.

FIG. 19 is a flowchart illustrating an example of a processing procedure of the electric power distribution determination process in the third embodiment of the present technology.

The electric power distribution determination section 160 sets a priority level in the order from the shortest time to next data transmission 648 (step S971) on the basis of information included in the electric power storage level notice received, repeating the following processes as the terminals subject to distribution in the specified order of priority levels. Therefore, a variable idx for repeating the processes is set to '1' (step S972). The terminal with a priority level matching this variable idx is the terminal subject to distribution. That is, distribution of electric power is controlled in the following manner on the basis of the priority levels of the terminals to which electric power is to be distributed.

The variable idx is incremented by one at a time (step S976). When there is no longer any terminal having a priority level matching this variable idx (No in step S973), the process ends. Also, a variable idx2 is set to '1,' and a variable idx3 is set to 'n,' each variable being variables to compare the priority levels (step S974).

First, it is determined whether or not the electric power storage level of the terminal subject to distribution is equal to or exceeds the electric power level required for data transmission (step S975). In the case where the electric power storage level of the terminal subject to distribution is smaller than that required for data transmission (No in step S975), distribution of electric power is required. Therefore, a process is performed to determine the electric power level to be distributed from each terminal.

Here, the variables idx, idx2, and idx3 are compared, thus allowing for comparison of the priority level with the terminal subject to distribution. As a result, the following processes are performed (steps S977 to S979). That is, a high priority terminal process is performed for the terminals whose priority levels are higher than that of the terminal subject to distribution (step S980), and a low priority terminal process is performed for the terminals whose priority levels are lower than that of the terminal subject to distribution (step S990).

In the case where the electric power storage level of the terminal subject to distribution reaches or exceeds the electric power level required for data transmission after the distribution is performed through repetition of these processes (Yes in step S975), the process for this terminal subject to distribution is terminated to proceed with the process for the terminal with the next priority level (step S976). Then, in the case where the process is completed for all the terminals, or in the case where there is no longer any terminal to which electric power is to be distributed, the electric power distribution determination process flow ends.

Figure 20:
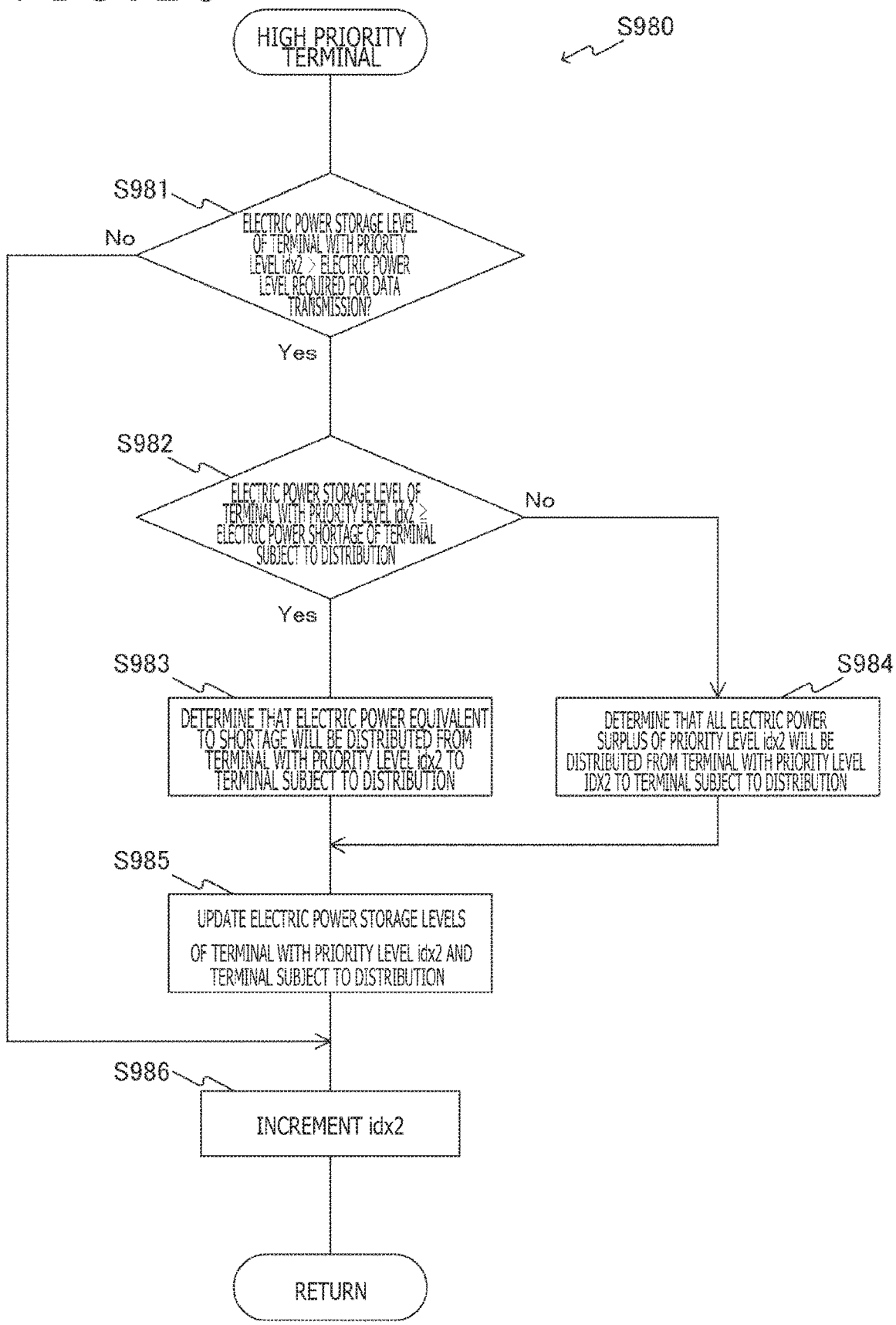
FIG. 20 is a flowchart illustrating an example of a processing procedure of a high priority terminal process (step S980) of the electric power distribution determination process in the third embodiment of the present technology.

FIG. 20 is a flowchart illustrating an example of a processing procedure of the high priority terminal process (step S980) of the electric power distribution determination process in the third embodiment of the present technology.

Electric power levels to be distributed are determined for the terminals whose priority levels are higher than that of the terminal subject to distribution (terminals with a priority level idx2) in the order from the highest priority level. It is determined whether or not the terminal with the priority level idx2 has an electric power surplus (step S981). In the case where the terminal has an electric power surplus (Yes in step S981), it is determined whether or not the electric power storage level of the terminal is equal to or exceeds the electric power shortage of the terminal subject to distribution (step S982). If the electric power storage level of the terminal is equal to or exceeds the electric power shortage of the terminal subject to distribution (Yes in step S982), it is determined that electric power equal to the shortage will be distributed from the terminal with the priority level idx2 to the terminal subject to distribution (step S983).

On the other hand, if the electric power storage level of the terminal is smaller than the electric power shortage of the terminal subject to distribution (No in step S982), it is determined that all the electric power surplus of the terminal with the priority level idx2 will be distributed from the terminal with the priority level idx2 to the terminal subject to distribution (step S984).

Then, in any case, the electric power storage levels of the terminal with the priority level idx2 and the terminal subject to distribution are updated (step S985). Then, when this series of processes is terminated, the variable idx2 is incremented by one (step S986).

In the case where even if, despite the above processes are performed for all the terminals whose priority levels are higher than that of the terminal subject to distribution, the electric power storage level of the terminal subject to distribution falls short of the electric power level required for data transmission, the terminals whose priority levels are lower than that of the terminal subject to distribution will be examined.

Figure 21:
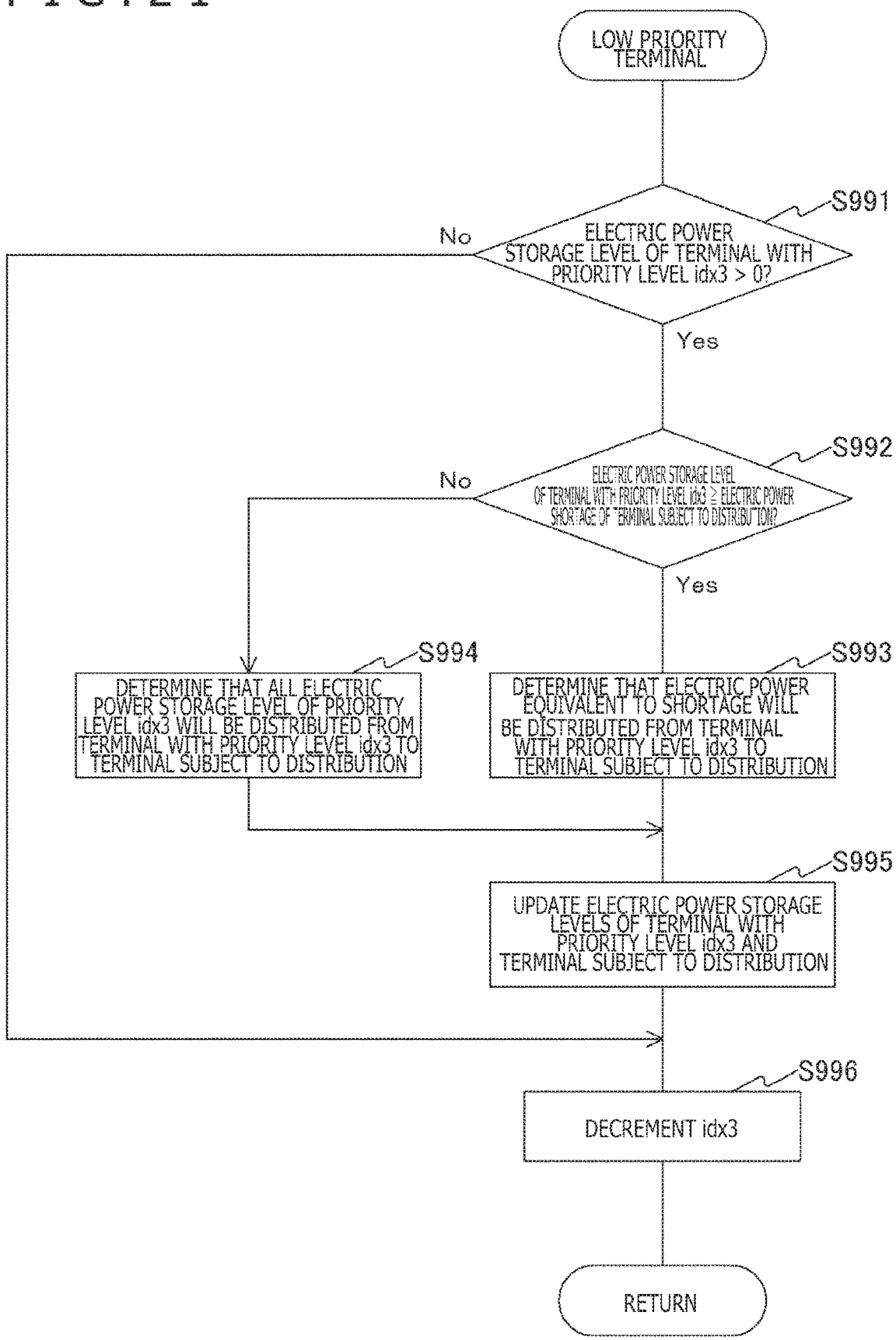
FIG. 21 is a flowchart illustrating an example of a processing procedure of a low priority terminal process (step S990) of the electric power distribution determination process in the third embodiment of the present technology.

FIG. 21 is a flowchart illustrating an example of a processing procedure of the low priority terminal process (step S990) of the electric power distribution determination process in the third embodiment of the present technology.

Electric power levels to be distributed are determined for the terminals whose priority levels are lower than that of the terminal subject to distribution (terminals with a priority level idx3) in the order from the lowest priority level. If the electric power storage level of the terminal with the priority level idx3 is "0" (No in step S996), the variable idx3 is decremented by one (step S996), and the process is terminated.

In the case where the electric power storage level of the terminal with the priority level idx3 is larger than "0" (Yes in step S996), it is determined whether or not the electric power storage level of the terminal with the priority level idx3 is equal to or exceeds the electric power shortage of the terminal subject to distribution (step S992). If the electric power storage level of the terminal is equal to or exceeds the electric power shortage of the terminal subject to distribution (Yes in step S992), it is determined that electric power equal to the shortage will be distributed from the terminal with the priority level idx3 to the terminal subject to distribution (step S993).

On the other hand, if the electric power storage level of the terminal is smaller than the electric power shortage of the terminal subject to distribution (No in step S992), it is determined that all the electric power of the terminal with the priority level idx3 will be distributed from the terminal with the priority level idx3 to the terminal subject to distribution (step S994).

Then, in any case, the electric power storage levels of the terminal with the priority level idx3 and the terminal subject to distribution are updated (step S995). Then, when this series of processes is terminated, the variable idx3 is decremented by one (step S996).

Specific Example

FIGS. 22A, 22B, 22C, and 22D depict diagrams illustrating a specific example of an electric power level for electric power distribution in the third embodiment of the present technology.

Here, as illustrated in FIG. 22A, it is assumed that the four terminals #1 to #4 are present and that the electric power storage levels thereof are "40," "15," "12," and "35," respectively. Also, it is assumed that time to next transmission for each of the terminals is "5 minutes," "10 minutes," "3 minutes," and "12 minutes," respectively. Therefore, high priority levels are assigned to the terminals #1 to #4 as priority levels in the order from the shortest time to next transmission, and the priority levels are higher in the order of the terminal #3, the terminal #1, the terminal #2, and the terminal #4. It is also assumed that the electric power required for data transmission is "30."

First, as illustrated in FIG. 22B, electric power is distributed to the terminal #3. As a result, "18" worth of electric power is distributed from the terminal #4 to the terminal #3.

Next, as illustrated in FIG. 22C, distribution of electric power to the terminal #1 is examined. However, electric power required for data transmission is stored in the terminal 1 #. Therefore, no electric power is distributed.

Next, as illustrated in FIG. 22C, electric power is distributed to the terminal #2. As a result, "10" worth of electric power is distributed from the terminal #1 to the terminal #2, and "5" worth of electric power is distributed from the terminal #4 to the terminal #2.

As a result, the terminal #3 that has been unable to transmit data with the level of electric power stored with its own power generation alone due to the short time available before next data transmission is performed is now capable of transmitting data thanks to this distribution of electric power. On the other hand, the terminal #4 is now in shortage of electric power required for data transmission. However, the terminal #4 still has a long time before performance of next transmission. Therefore, electric power generated by itself and distribution of electric power from other terminals through a following electric power distribution process will allow the terminal #4 to transmit data.

As described above, the third embodiment of the present technology preferentially distributes electric power to the terminals with short time available before performance of next data transmission even in the case of shortage of electric power in the wireless communication system as a whole, thus preventing a situation where data cannot be transmitted due to shortage of electric power.

4. Fourth Embodiment

The electric power distribution determination process of the third embodiment described above may lead to a situation where data cannot be transmitted on a regular basis due to shortage of electric power in the case where power is not generated before performance of next data transmission. For this reason, in this fourth embodiment, the terminals whose pieces of data to be transmitted on a regular basis are presumed to be similar are grouped and electric power is distributed such that at least one terminal in the group can carry out transmission.

It should be noted that the overall configuration of the wireless communication system and the configurations of the terminal 100 and the control station 200 of this fourth embodiment are similar to those of the second embodiment described above. Therefore, a detailed description will be omitted.

Figures 23, 24:
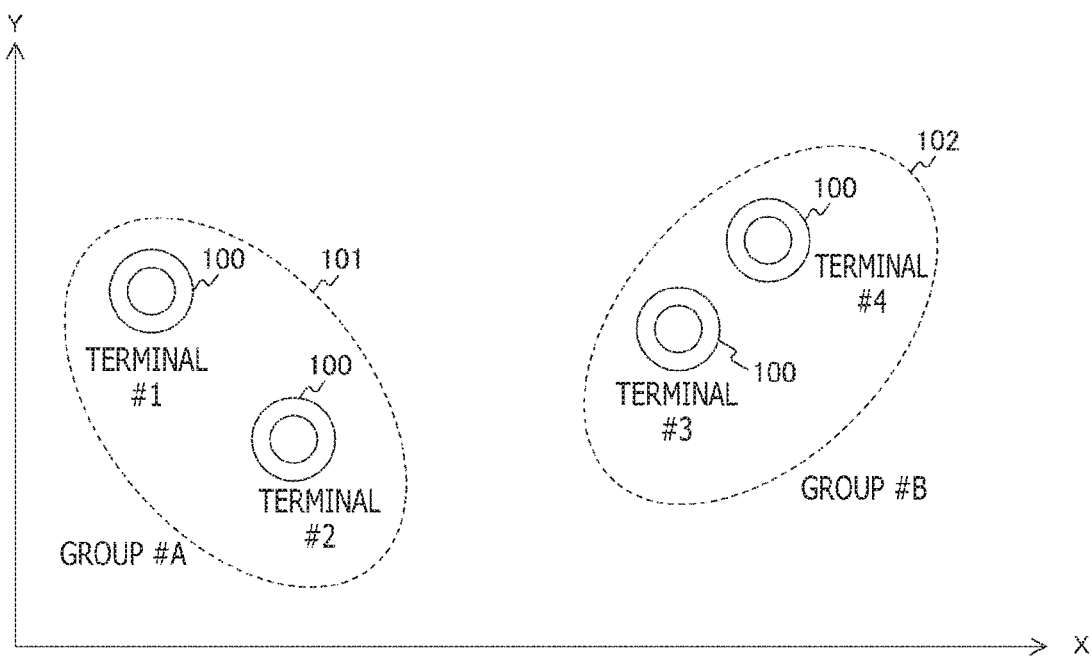
FIG. 23 is a diagram illustrating an example of grouping of terminals in a fourth embodiment of the present technology.
FIG. 24 is a diagram illustrating a configuration example of a field of the payload 640 of an electric power storage level notice frame of the fourth embodiment of the present technology.

FIG. 23 is a diagram illustrating an example of grouping terminals in the fourth embodiment of the present technology.

Here, a system in which temperature information is acquired and transmitted regularly is assumed as an example. In this case, the temperature difference between closely located terminals is small. Therefore, as long as terminals installed close to each other are grouped and at least one of the terminals in each group can transmit sensing data, there will be no loss of data collected from location and temperature information, albeit with a decline in accuracy. For this reason, a high priority level is assigned to a terminal representing each of all groups of the wireless communication system, and electric power is distributed such that at least one of the terminals in each group is capable of transmitting data.

For example, the terminals #1 to #4 are assumed to be provided in a two-dimensional coordinate system as illustrated in FIG. 23. In this case, a possible approach would be to group the terminals installed close to each other and put together the terminals #1 and #2 as a group A (101) and the terminals #3 and #4 as a group B (102).

As such a grouping technique, one could divide an entire reception range of the control station 200 into blocks and group the terminals 100 that belong to each block. The grouping technique is not limited to the above.

Configuration of the Frame

FIG. 24 is a diagram illustrating a configuration example of a field of the payload 640 of an electric power storage level notice frame of the fourth embodiment of the present technology. It should be noted that the configuration of the frame as a whole is similar to that of the first embodiment described above, and thus, a detailed description will be omitted.

The electric power storage level notice frame of this fourth embodiment includes a field of position coordinates 649 in addition to the fields of the electric power storage level notice frame described in the first embodiment. The position coordinates 649 indicate position coordinates of the terminal 100. The terminal 100 is assumed to include a GPS sensor as the sensor 110, thus allowing for acquisition of the position coordinates. Alternatively, in the case of a stationary terminal, the position coordinates may be retained at the time of installation.

Operation

Figure 25:
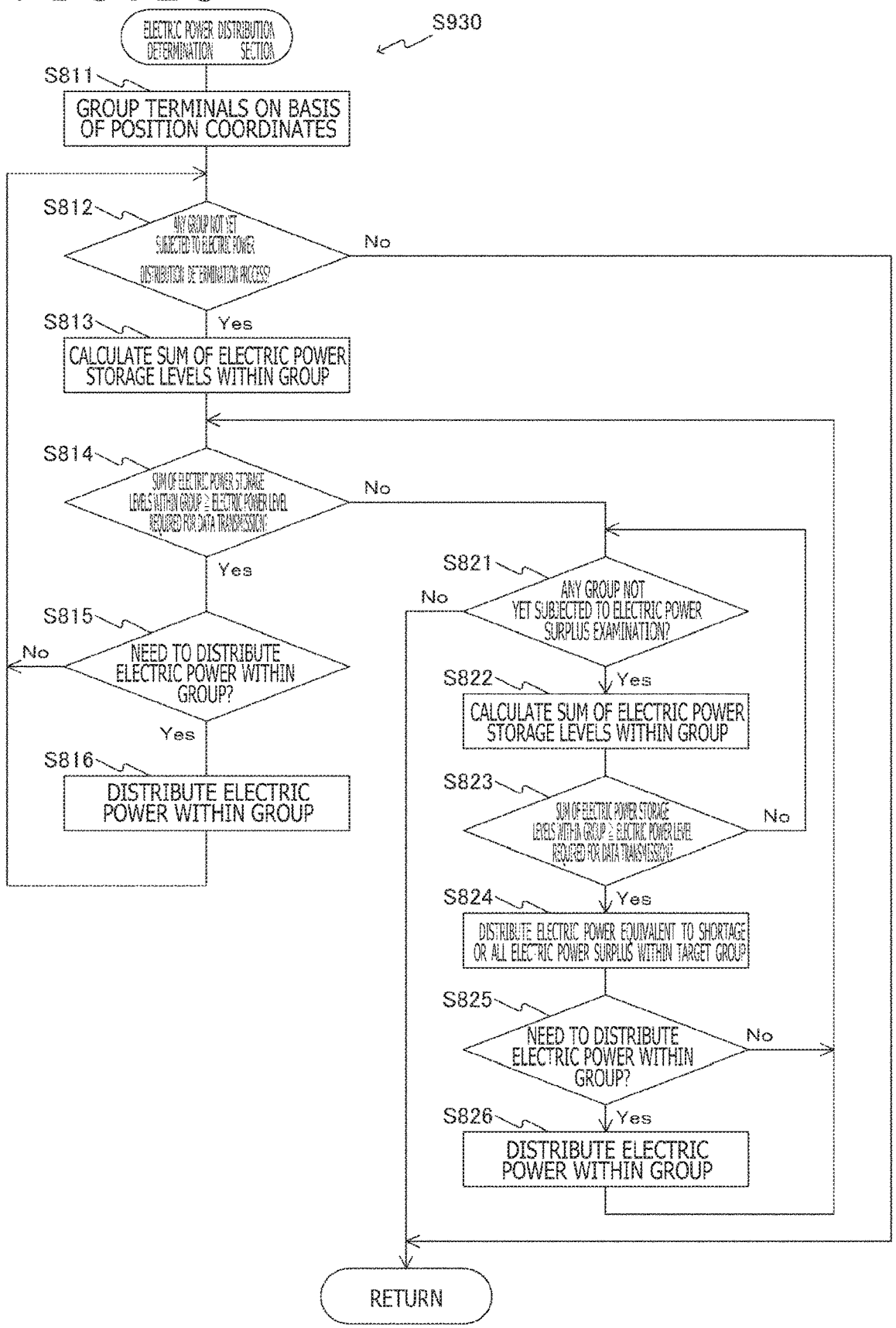
FIG. 25 is a flowchart illustrating an example of a processing procedure of the electric power distribution determination process in the fourth embodiment of the present technology.

FIG. 25 is a flowchart illustrating an example of a processing procedure of the electric power distribution determination process in the fourth embodiment of the present technology.

The electric power distribution determination section 160 classifies (groups) the terminals 100 into groups on the basis of the position coordinates of the terminals 100 stored in the payloads of the electric power storage level notices received (step S811).

The electric power distribution determination section 160 calculates the sum of the electric power storage levels within the group (step S813) and determines whether or not the sum of the electric power storage levels within the group is equal to or exceeds the electric power level required for data transmission (step S814). In the case where the sum of the electric power storage levels within the group is equal to or exceeds the electric power level required for data transmission (Yes in step S814), and if distribution of electric power is required within the group (Yes in step S815), electric power is distributed within the group (step S816). This allows for at least one of the terminals 100 to transmit data.

On the other hand, in the case where the sum of the electric power storage levels within the wireless communication group is smaller than the electric power level required for data transmission (No in step S814), electric power is distributed from another group. For this reason, the sum of the electric power storage levels in the other group is calculated (step S822), thus determining whether or not the other group has more electric power than that required for data transmission, i.e., an electric power surplus (step S823). In the case where the other group has an electric power surplus (Yes in step S823), electric power equal to the shortage of the group subject to distribution or all the electric power surplus is distributed to the target group (step S824). At this time, if distribution of electric power is required within the group (Yes in step S825), electric power is distributed within the group (step S826). These processes are repeated until the sum of the electric power storage levels within the group subject to distribution reaches or exceeds the electric power level required for data transmission (No in step S823).

When there is no longer any group that has yet to be subjected to the electric power distribution determination process (No in step S812), or when there is no longer any group whose electric power surplus has yet to be examined (No in step S821), this process is terminated.

Specific Example

FIGS. 26A and 26B depict diagrams illustrating a specific example of an electric power level for electric power distribution in the fourth embodiment of the present technology.

In this example, the electric power storage levels of the terminals #1 to #4 before the distribution of electric power are "50," "40," "5," and "12," respectively, as illustrated in FIG. 26A. In addition, it is assumed that the electric power required for data transmission is "30." At this time, although the terminals #1 and #2 meet a requirement of electric power required for data transmission, the terminals #3 and #4 both do not meet the requirement. As for the grouping, it is assumed that the terminals #1 and #2 are classified as the group A and the terminals #3 and #4 are classified as the group B as with the example described above.

For this reason, electric power is distributed such that at least one of the terminals #3 and #4 can transmit data. As a result, "13" worth of electric power is distributed from the terminal #1 to the group B, and "5" worth of electric power of the terminal #3 is distributed to the terminal #4. This increases the electric power storage level of the terminal #4 to "30," thus allowing the terminal #4 to transmit data.

As described above, the fourth embodiment of the present technology ensures, even in the case of shortage of electric power in the wireless communication system as a whole, that at least one of the terminals located close to each other is capable of transmitting data by capitalizing on the fact that the difference in data is small between the closely located terminals, thus preventing loss of data.

5. Fifth Embodiment

Wireless Communication System

Figure 27:
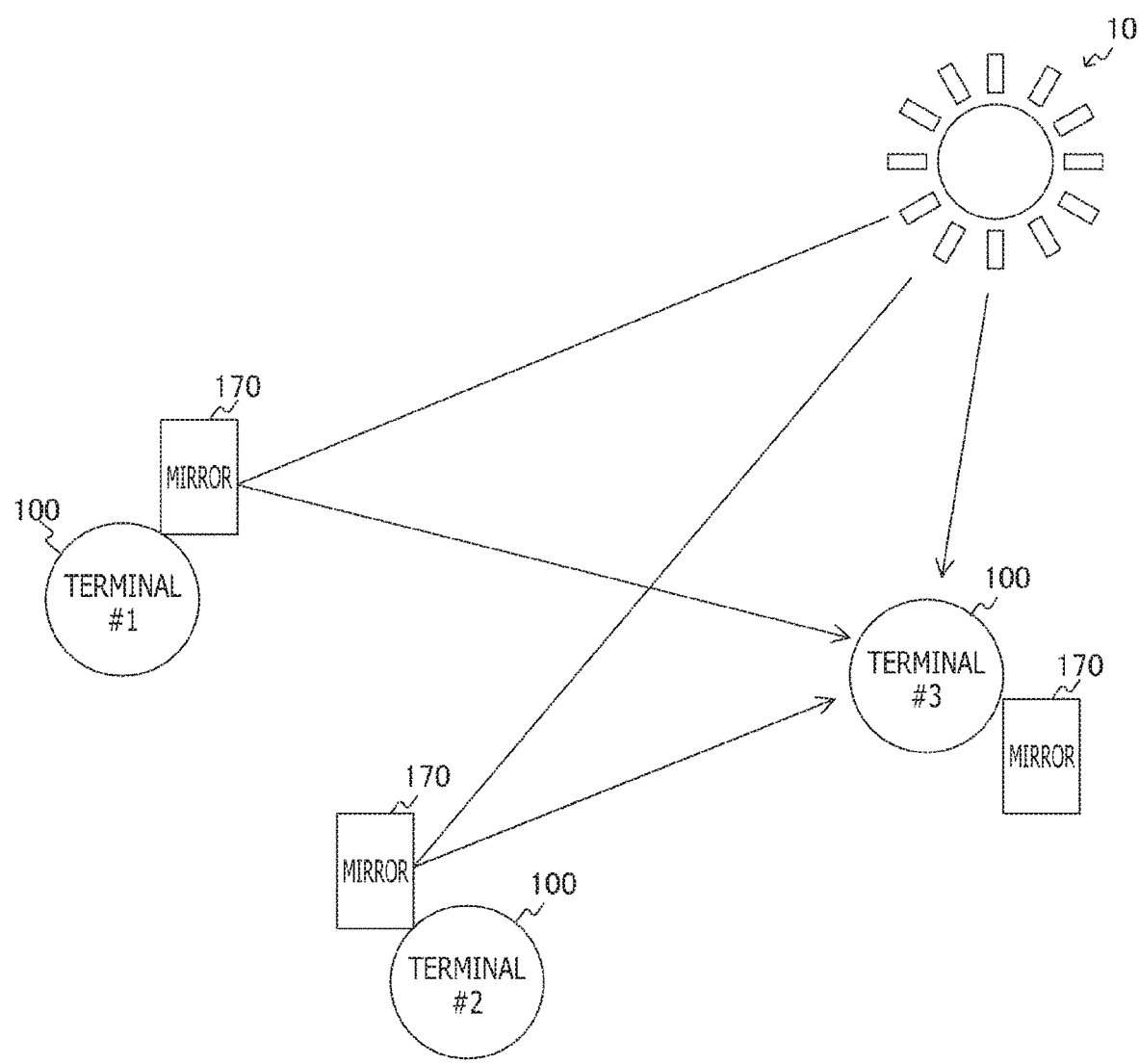
FIG. 27 is a diagram illustrating an example of an overall configuration of the wireless communication system of a fifth embodiment of the present technology.

FIG. 27 is a diagram illustrating an example of an overall configuration of the wireless communication system of a fifth embodiment of the present technology.

While a description has been given with respect to the techniques by which electric power is to be distributed in the above embodiments, the present technology is not limited to electric power that has been generated, and a material used for power generation may be distributed. In this fifth embodiment, a description will be given of a technique for distributing light as a material used for power generation.

In the wireless communication system of this fifth embodiment, the three terminals #1 to #3 (100) use their power generation sections 140 to generate power from sunlight from sun 10. Here, the terminals #1 to #3 each include a mirror 170. The mirror 170 reflects sunlight to distribution sunlight to the other terminals.

In this example, it is assumed that the terminals #1 and #2 have enough generated electric power and that the terminal #3 is in shortage of electric power. For this reason, sunlight received by the terminals #1 and #2 is distributed to the terminal #3. The terminal #3 that has received distribution of sunlight from the terminals #1 and #2 generates power with its power generation section 140 by using the distributed sunlight together with sunlight that has been received directly from the sun.

It should be noted that the terminal subject to distribution and the distribution level are similar to those in the electric power distribution determination processes of the first to fourth embodiments.

As described above, the fifth embodiment of the present technology allows for distribution of a material used for power generation to the other terminal 100 by reflecting sunlight from the sun 10 with the mirror 170.

6. Sixth Embodiment

While a description has been given of the techniques by which power is generated in the terminals 100 each having a power generation section, the terminals 100 need not necessarily include a power generation section. In this sixth embodiment, a description will be given of a technique for distributing electric power by sharing a power generation section in the entire wireless communication system.

Configuration of the Terminal

Figure 28:
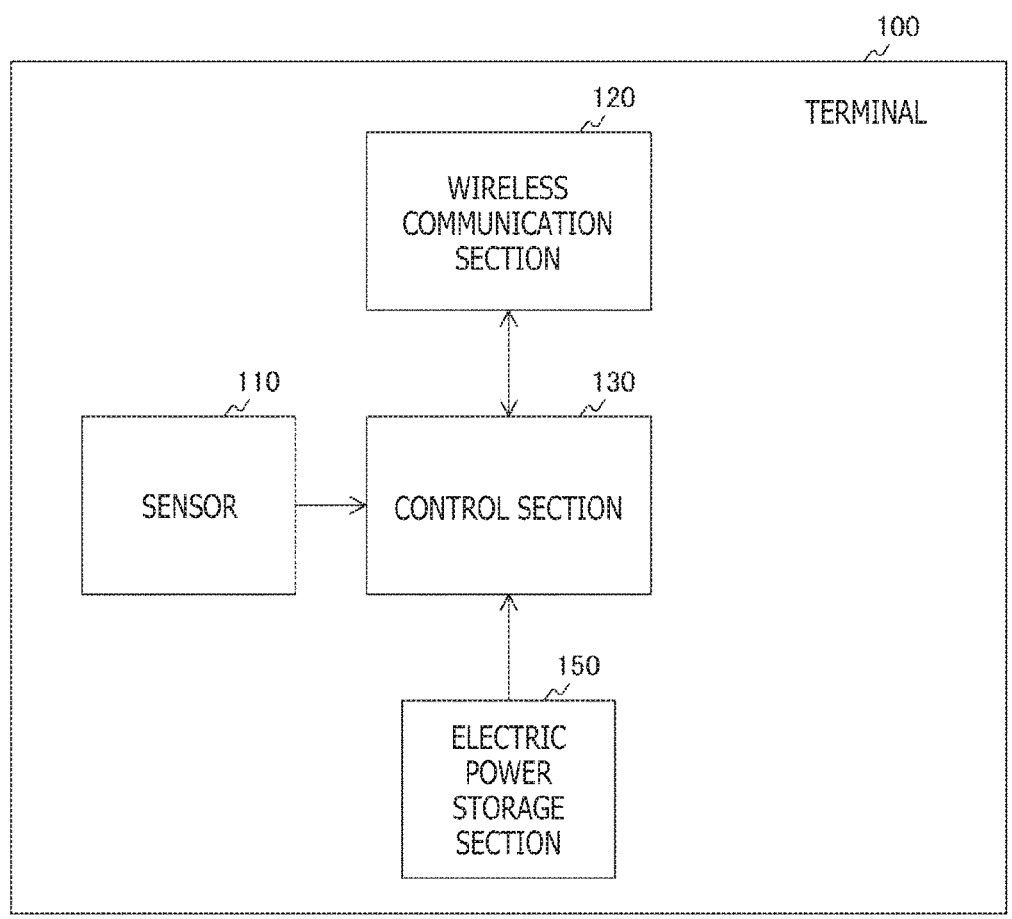
FIG. 28 is a diagram illustrating a configuration example of the terminal 100 of a sixth embodiment of the present technology.

FIG. 28 is a diagram illustrating a configuration example of the terminal 100 of a sixth embodiment of the present technology.

The terminal 100 of this sixth embodiment differs in that the power generation section 140 has been removed from the terminal 100 of the second embodiment but is similar thereto in all other respects. Therefore, a detailed description will be omitted.

Configuration of the Control Station

Figure 29:
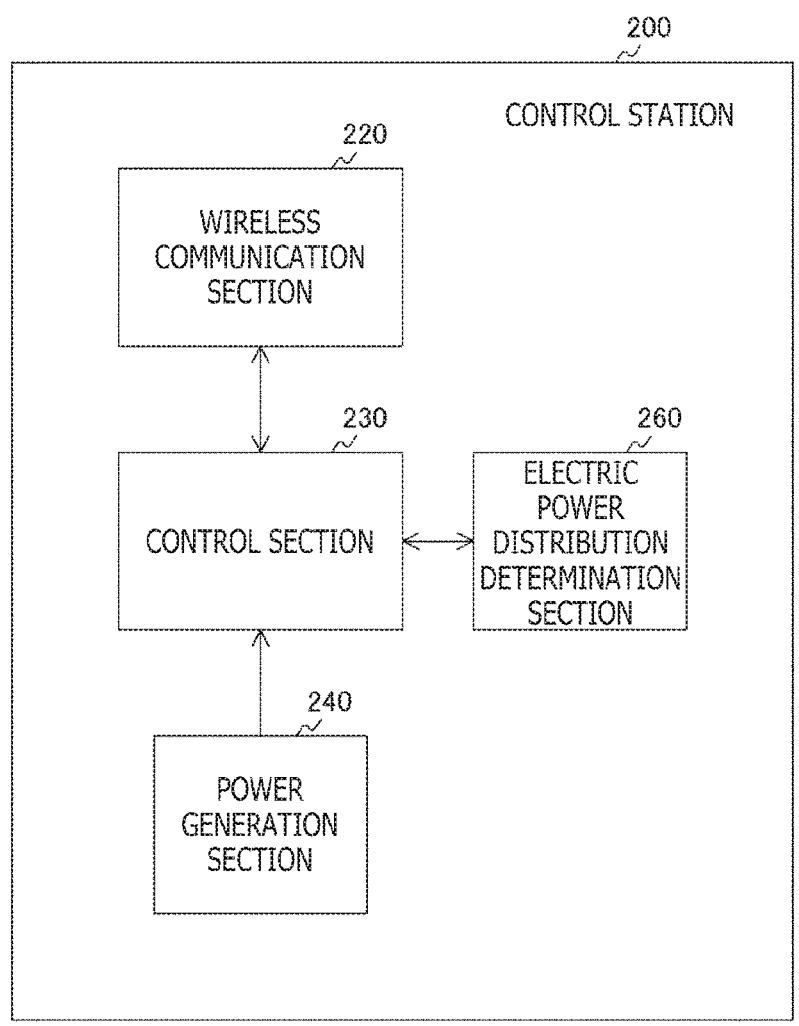
FIG. 29 is a diagram illustrating a configuration example of the control station 200 of the sixth embodiment of the present technology.

FIG. 29 is a diagram illustrating a configuration example of the control station 200 of the sixth embodiment of the present technology.

The control station 200 of this sixth embodiment includes a power generation section 240 in addition to the wireless communication section 220, the control section 230, and the electric power distribution determination section 260 that have been described above in the second embodiment. The power generation section 240 converts ambient energy into electric power as does the power generation section 140. The control station 200 is similar to that of the second embodiment in all other respects. Therefore, a detailed description will be omitted.

It should be noted that while an example of incorporating the power generation section in the control station 200 has been described in this example, the power generation section may be provided separately from the control station 200.

Operation

FIG. 30 is a sequence diagram illustrating an example of a processing flow of the wireless communication system of the sixth embodiment of the present technology.

First, the terminals #1 to #4 transmit a power generation material (material used for power generation) to the control station 200 on a regular basis (731). At this time, the terminals #1 to #4 not only transmits a power generation material but also gives an electric power storage level notice, thus notifying the control station 200 of the current electric power storage level.

The control station 200 that has received the power generation material carries out power generation (732). Then, the control station 200 determines the distribution levels for the terminals #1 to #4 (733), distributing electric power to the terminals #1 to #4 on the basis of the distribution levels determined (734).

The electric power distribution determination processes described above with respect to the first to fourth embodiments can be applied as a technique for determining the distribution levels for the terminals. That is, in the case where the electric power distribution determination processes of the first and second embodiments are applied, electric power of a level equal to the shortage for data transmission is distributed to each terminal. Also, in the case where the electric power distribution determination process of the third embodiment is applied, electric power of a level equal to the shortage for data transmission is preferentially distributed to the terminal whose time available until the performance of next data transmission is short. Also, in the case where the electric power distribution determination process of the fourth embodiment is applied, terminals located close to each other are grouped together, and electric power is distributed such that at least one terminal in each group is capable of transmitting data.

As described above, the sixth embodiment of the present technology shares a power generation section in the entire wireless communication system, allowing for distribution of necessary electric power. This eliminates the need for each terminal to have a power generation section, providing an effect of facilitating the manufacture. Also, electric power generated by the shared power generation section is effectively distributed to the terminals, thus preventing a situation in which data transmission cannot be carried out and avoiding data loss.

It should be noted that the above embodiments are merely examples for realizing the present technology, and the matters in the embodiments and the matters defining the invention in the claims are in correspondence with each other. Similarly, the matters defining the invention in the claims and the matters having the same names in the embodiments of the present technology are in correspondence with each other. It should be noted, however, that the present technology is not limited to the embodiments and can be realized by modifying the embodiments in various ways without departing from the gist thereof.

Also, the processing procedures described in the above embodiments may be construed as methods having a series of these steps or a program for causing a computer to perform the series of these steps and a recording medium storing the program. Among examples of this recording medium are a CD (Compact Disc), an MD (MiniDisc), a DVD (Digital Versatile Disc), a memory card, and a Blu-ray (registered trademark) Disc.

It should be noted that the effects described in the present specification are merely illustrative and not restrictive, and there may be other effects.

It should be noted that the present technology can also have the following configurations.

(1)

A wireless communication apparatus including:

an electric power storage section adapted to store electric power;

a wireless communication section adapted to engage in wireless communication with other wireless communication apparatuses by using electric power stored in the electric power storage section; and a control section adapted to perform control such that the electric power stored in the electric power storage section is passed to or from the other wireless communication apparatuses according to a priority level assigned to each of the wireless communication apparatuses, by using an electric power level required to operate the wireless communication section as a threshold.

(2)

The wireless communication apparatus of (1) above, in which the control section performs control such that if an electric power storage level in the electric power storage section is larger than the electric power level required to operate the wireless communication section, electric power is distributed to the other wireless communication apparatuses and if the electric power storage level in the electric power storage section is smaller than the electric power level required to operate the wireless communication section, distribution of electric power from the other wireless communication apparatuses is accepted.

(3)

The wireless communication apparatus of (1) or (2) above, in which the control section performs control such that electric power is distributed from a wireless communication apparatus with the low priority level to a wireless communication apparatus with the high priority level on the basis of the priority level assigned to a wireless communication apparatus to which electric power is to be distributed.

(4)

The wireless communication apparatus of any one of (1) to (3) above, in which the greater a shortage of electric power required to operate the wireless communication section, the larger a value assigned as the priority level.

(5)

The wireless communication apparatus of any one of (1) to (3) above, in which the shorter the time to next transmission, the larger a value assigned as the priority level.

(6)

The wireless communication apparatus of any one of (1) to (3) above, in which a large value is assigned as the priority level to a wireless communication apparatus representing each predetermined group.

(7)

The wireless communication apparatus of (6) above, in which the groups are formed according to position coordinates of the wireless communication apparatuses.

(8)

The wireless communication apparatus of any one of (1) to (7) above further including:

an electric power distribution determination section adapted to determine an electric power level to be passed, on the basis of an electric power storage level of each of the electric power storage sections of the other wireless communication apparatuses and own wireless communication apparatus.

(9)

The wireless communication apparatus of any one of (1) to (8) above further including:

a power generation section adapted to generate electric power, in which the electric power storage section stores the electric power generated by the power generation section.

(10)

The wireless communication apparatus of any one of (1) to (9) above further including:

a sensor adapted to measure an ambient environment, in which the wireless communication section transmits sensing results measured by the sensor, through wireless communication.

(11)

A wireless communication apparatus including:

a wireless communication section adapted to receive a notice regarding electric power storage levels of electric power storage sections of other wireless communication apparatuses;

a control section adapted to assign priority levels to the other wireless communication apparatuses; and an electric power distribution determination section adapted to determine an electric power level to be passed to or from the other wireless communication apparatuses according to the priority level assigned to each of the wireless communication apparatuses, in order to control passing of electric power stored in the electric power storage section, by using an electric power level required to operate a wireless communication section of the wireless communication apparatus as a threshold.

(12)

An electric power distribution control method including:

a step in which a wireless communication section receives a notice regarding electric power storage levels of electric power storage sections of other wireless communication apparatuses;

a step in which a control section assigns priority levels to the other wireless communication apparatuses; and a step in which an electric power distribution determination section determines an electric power level to be passed to or from the other wireless communication apparatuses according to the priority level assigned to each of the wireless communication apparatuses, in order to control passing of electric power stored in the electric power storage section, by using an electric power level required to operate a wireless communication section of the wireless communication apparatus as a threshold.

(13)

A program causing a computer to perform:

a step of receiving a notice regarding electric power storage levels of electric power storage sections of other wireless communication apparatuses;

a step of assigning priority levels to the other wireless communication apparatuses; and a step of determining an electric power level to be passed to or from the other wireless communication apparatuses according the priority level assigned to each of the wireless communication apparatuses, in order to control passing of electric power stored in the electric power storage section, by using an electric power level required to operate a wireless communication section of the wireless communication apparatus as a threshold.

REFERENCE SIGNS LIST

100 Terminal
110 Sensor
120 Wireless communication section
130 Control section
140 Power generation section
150 Electric power storage section
160 Electric power distribution determination section
170 Mirrors
200 Control station
220 Wireless communication section
230 Control section
240 Power generation section
260 Electric power distribution determination section

The invention claimed is:

1. A wireless communication apparatus of a plurality of wireless communication apparatuses, comprising:

an electric power storage section configured to store electric power;

a wireless communication section configured to engage in wireless communication with wireless communication apparatuses, other than the wireless communication apparatus, of the plurality of wireless communication apparatuses by using electric power stored in the electric power storage section;
an electric power distribution determination section configured to:
determine electric power surplus and electric power shortage of each wireless communication apparatus of the plurality of wireless communication apparatuses,
calculate a sum of the determined electric power surplus of each wireless communication apparatus of the plurality of wireless communication apparatuses and a sum of determined electric power shortage of each wireless communication apparatus of the plurality of wireless communication apparatuses,
compare the calculated sum of electric power surplus and the calculated sum of electric power shortage,
determine, based on a threshold, at least one wireless communication apparatus of the plurality of wireless communication apparatuses with shortage in the electric power, and
calculate a specific electric power to be distributed to the determined at least one wireless communication apparatus based on a result of the comparison that the calculated sum of electric power surplus is greater than the calculated sum of electric power shortage; and
a control section configured to control distribution of the specific electric power to the determined at least one wireless communication apparatus.

2. The wireless communication apparatus of claim 1, wherein
the control section is further configured to assign a priority level to each wireless communication apparatus of the plurality of wireless communication apparatuses; and
the electric power distribution determination section is further configured to distribute the specific electric power from a wireless communication apparatus with a low priority level to a wireless communication apparatus with a high priority level.

3. The wireless communication apparatus of claim 2, wherein greater a shortage of electric power required to operate the wireless communication section, larger a value assigned as the priority level.

4. The wireless communication apparatus of claim 1, wherein shorter a time to next transmission, larger a value assigned as a priority level of each wireless communication apparatus of the plurality of wireless communication apparatuses.

5. The wireless communication apparatus of claim 1, wherein a large value is assigned as a priority level to a wireless communication apparatus representing a specific group.

6. The wireless communication apparatus of claim 5, wherein the specific group is formed according to position coordinates of the plurality of wireless communication apparatuses.

7. The wireless communication apparatus of claim 1, wherein
the electric power distribution determination section is further configured to determine an electric power level to be passed based on an electric power storage level of each of the electric power storage sections of the plurality of wireless communication apparatuses.

8. The wireless communication apparatus of claim 1 further comprising:
a power generation section configured to generate electric power, wherein the electric power storage section is further configured to store the electric power generated by the power generation section.

9. The wireless communication apparatus of claim 1 further comprising:
a sensor configured to measure an ambient environment, wherein the wireless communication section is further configured to transmit sensing results measured by the sensor, through wireless communication.

10. A wireless communication apparatus of a plurality of wireless communication apparatuses, comprising:
a wireless communication section configured to receive a notice regarding electric power storage levels of electric power storage sections of wireless communication apparatuses, other than the wireless communication apparatus, of the plurality of wireless communication apparatuses;
an electric power distribution determination section configured to:
determine electric power surplus and electric power shortage of each wireless communication apparatus of the plurality of wireless communication apparatuses,
calculate a sum of the determined electric power surplus of each wireless communication apparatus of the plurality of wireless communication apparatuses and a sum of determined electric power shortage of each wireless communication apparatus of the plurality of wireless communication apparatuses,
compare the calculated sum of electric power surplus and the calculated sum of electric power shortage,
determine, based on a threshold, at least one wireless communication apparatus of the plurality of wireless communication apparatuses with shortage in electric power, and
calculate a specific electric power to be distributed to the determined at least one wireless communication apparatus based on a result of the comparison that the calculated sum of electric power surplus is greater than the calculated sum of electric power shortage; and
a control section configured to control distribution of the specific electric power to the determined at least one wireless communication apparatus.

11. An electric power distribution control method, comprising:
in a wireless communication apparatus of a plurality of wireless communication apparatuses:
receiving, by a wireless communication section, a notice regarding electric power storage levels of electric power storage sections of wireless communication apparatuses, other than the wireless communication apparatus, of the plurality of wireless communication apparatuses;
determining, by an electric power distribution determination section, electric power surplus and electric power shortage of each wireless communication apparatus of the plurality of wireless communication apparatuses;
calculating, by the electric power distribution determination section, a sum of the determined electric power surplus of each wireless communication apparatus of the plurality of wireless communication apparatuses and a sum of determined electric power shortage of each wireless communication apparatus of the plurality of wireless communication apparatuses;

comparing, by the electric power distribution determination section, the calculated sum of electric power surplus and the calculated sum of electric power shortage;

determining, by the electric power distribution determination section, at least one wireless communication apparatus of the plurality of wireless communication apparatuses with shortage in electric power, wherein the at least one wireless communication apparatus is determined based on a threshold;

calculating, by the electric power distribution determination section, a specific electric power to be distributed to the determined at least one wireless communication apparatus based on a result of the comparison that the calculated sum of electric power surplus is greater than the calculated sum of electric power shortage; and controlling, by a control section, distribution of the specific electric power to the determined at least one wireless communication apparatus.

12. A non-transitory computer-readable medium having stored thereon, computer-executable instructions which, when executed by a computer, cause the computer to execute operations, the operations comprising:

receiving a notice regarding electric power storage levels of electric power storage sections of wireless communication apparatuses, other than a wireless communication apparatus, of a plurality of wireless communication apparatuses;

determining electric power surplus and electric power shortage of each wireless communication apparatus of the plurality of wireless communication apparatuses;

calculating a sum of the determined electric power surplus of each wireless communication apparatus of the plurality of wireless communication apparatuses and a sum of determined electric power shortage of each wireless communication apparatus of the plurality of wireless communication apparatuses;

comparing the calculated sum of electric power surplus and the calculated sum of electric power shortage;

determining, based on a threshold, at least one wireless communication apparatus of the plurality of wireless communication apparatuses with shortage in electric power;

calculating a specific electric power to be distributed to the determined at least one wireless communication apparatus based on a result of the comparison that the calculated sum of electric power surplus is greater than the calculated sum of electric power shortage; and controlling distribution of the specific electric power to the determined at least one wireless communication apparatus.

* * * * *